United States Patent
Onda et al.

(10) Patent No.: US 9,349,168 B2
(45) Date of Patent: May 24, 2016

(54) IMAGE PROCESSING DEVICE AND METHOD TO CORRECT BRIGHTNESS SIGNAL OF AN INPUT IMAGE

(71) Applicants: Tsubasa Onda, Tokyo (JP); Yoshitaka Toyoda, Tokyo (JP); Daisuke Suzuki, Tokyo (JP); Koichi Yamashita, Tokyo (JP); Narihiro Matoba, Tokyo (JP)

(72) Inventors: Tsubasa Onda, Tokyo (JP); Yoshitaka Toyoda, Tokyo (JP); Daisuke Suzuki, Tokyo (JP); Koichi Yamashita, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/380,629

(22) PCT Filed: Feb. 21, 2013

(86) PCT No.: PCT/JP2013/054303
§ 371 (c)(1),
(2) Date: Aug. 22, 2014

(87) PCT Pub. No.: WO2013/129225
PCT Pub. Date: Sep. 6, 2013

(65) Prior Publication Data
US 2015/0016722 A1 Jan. 15, 2015

(30) Foreign Application Priority Data
Mar. 2, 2012 (JP) .................................. 2012-046369

(51) Int. Cl.
*G06K 9/00* (2006.01)
*G06K 9/40* (2006.01)
(Continued)

(52) U.S. Cl.
CPC ................ *G06T 5/009* (2013.01); *G06T 5/008* (2013.01); *H04N 1/6027* (2013.01); *H04N 5/235* (2013.01);
(Continued)

(58) Field of Classification Search
CPC . H04N 1/6027; H04N 5/2355; H04N 9/3182; H04N 9/73; H04N 9/77; H04N 9/3179; G06T 5/008; G06T 5/009; G06T 2207/10024; G06T 2207/20012
USPC .................................................. 382/167, 274
See application file for complete search history.

(56) References Cited

U.S. PATENT DOCUMENTS 7,847,973 B2 * 12/2010 Schoner .................... G09G 5/02
                                                        345/589
2005/0063603 A1 * 3/2005 Wang et al. .................... 382/254
(Continued)

FOREIGN PATENT DOCUMENTS

JP         7-23284 A    1/1995
JP    2002-152623 A    5/2002
(Continued)

*Primary Examiner* — Yubin Hung
(74) *Attorney, Agent, or Firm* — Birch, Stewart, Kolasch & Birch, LLP

(57) ABSTRACT

A region determination circuit (60) determines whether or not each of the pixels in an image is within a region subject to correction, in which pixels having at most a predetermined brightness level appear with a frequency equal to or less than a predetermined value. An offset level generation circuit (10) generates an offset level (Offset) on the basis of the brightness of the pixels determined to be within the region subject to correction. An offset subtraction circuit (1) subtracts the offset level (Offset) from the image signal (Yi) to generate an offset image signal (Yofst). A gain generation circuit (20) generates a gain for the offset image signal (Yofst). A gain multiplication circuit (2) multiplies the offset image signal (Yofst) by the gain to generate a corrected image signal (Ya).

10 Claims, 13 Drawing Sheets

(51) Int. Cl.
  *G06T 5/00*   (2006.01)
  *H04N 5/235*  (2006.01)
  *H04N 9/31*   (2006.01)
  *H04N 1/60*   (2006.01)
  *H04N 9/73*   (2006.01)
  *H04N 9/77*   (2006.01)

(52) U.S. Cl.
  CPC .............. *H04N 9/3179* (2013.01); *H04N 9/73* (2013.01); *H04N 9/77* (2013.01); *G06T 2207/10024* (2013.01); *G06T 2207/20012* (2013.01); *H04N 5/2355* (2013.01)

(56) References Cited

U.S. PATENT DOCUMENTS

| | | | |
|---|---|---|---|
| 2006/0209198 A1* | 9/2006 | Kitaoka et al. | 348/241 |
| 2007/0229863 A1 | 10/2007 | Ono et al. | |
| 2007/0297690 A1* | 12/2007 | Yu et al. | 382/274 |
| 2008/0232692 A1* | 9/2008 | Kaku | 382/190 |
| 2009/0022395 A1* | 1/2009 | Cho et al. | 382/167 |
| 2009/0092337 A1* | 4/2009 | Nagumo | 382/299 |
| 2009/0135210 A1* | 5/2009 | Feng et al. | 345/690 |
| 2009/0231460 A1 | 9/2009 | Wen | |
| 2010/0329553 A1 | 12/2010 | Shiokawa et al. | |

FOREIGN PATENT DOCUMENTS

| | | |
|---|---|---|
| JP | 2002-290707 A | 10/2002 |
| JP | 2005-130486 A | 5/2005 |
| JP | 2005-341527 A | 12/2005 |
| JP | 2006-13863 A | 1/2006 |
| JP | 2007-4675 A | 1/2007 |
| JP | 2008-46017 A | 2/2008 |
| JP | 2008-124653 A | 5/2008 |
| JP | 2009-44628 A | 2/2009 |
| JP | 2009-296210 A | 12/2009 |
| JP | 2010-98553 A | 4/2010 |
| JP | 2011-14958 A | 1/2011 |
| JP | 2012-33084 A | 2/2012 |

* cited by examiner

IMAGE PROCESSING DEVICE AND METHOD TO CORRECT BRIGHTNESS SIGNAL OF AN INPUT IMAGE

TECHNICAL FIELD

The present invention relates to an image processing device and method that correct the brightness signal of an input image.

BACKGROUND ART

Gradation corrections of the brightness signal of an image have been carried out to improve the visibility of subjects (people, animals, vehicles, road signs, or the like) in images that have been taken in foggy, hazy, or rainy weather and have a narrow brightness signal distribution. When gradation corrections are performed, if a part of the image having a narrow brightness distribution includes a portion with extremely high brightness or extremely low brightness, the gradation correction of the image with the narrow brightness distribution is inadequate. A known countermeasure is to convert brightnesses in the input image data that are equal to or greater than a given brightness on the high brightness side to the maximum brightness, convert brightnesses equal to or less than a given brightness on the low brightness side to the minimum brightness, and stretch intermediate brightnesses linearly from the minimum brightness to the maximum brightness according to their brightness values (see, for example, Patent Reference 1).

PRIOR ART REFERENCES

Patent Reference

Patent Reference 1: JP 2002-152623 (p. 3, paragraph 0007)

SUMMARY OF THE INVENTION

Problems to be Solved by the Invention

A problem with conventional image processing devices that are configured to convert brightnesses in input image data that are equal to or greater than a given brightness on the high brightness side to the maximum brightness, convert brightnesses equal to or less than a given brightness on the low brightness side to the minimum brightness, and stretch intermediate brightnesses linearly from the minimum brightness to the maximum brightness according to their brightness values is that parts of the image having brightnesses equal to or less than the given brightness on the low brightness side vanish into black, and if steps are taken to prevent this black collapse of parts of the image having brightnesses equal to or less than the given brightness on the low brightness side, the improvement of contrast in parts of the image with intermediate brightness is inadequate.

The present invention addresses the above problems of the prior art with the object of obtaining an image processing device that can correct contrast, in an image including both an image region in which the gradation signal distribution is narrowed by fog or the like and a low brightness image region, by widening the brightness signal distribution of the image regions having a narrow brightness signal distribution without causing black collapse in the low brightness image regions.

Means for Solving the Problem

To solve the foregoing problems, an image processing device according to the invention comprises:

a region decision circuit for deciding whether each pixel of an image represented by an image signal is disposed within a region subject to correction, in which pixels having at most a predetermined brightness level appear with a frequency equal to or less than a predetermined value;

an offset level generation circuit for generating an offset level on a basis of the brightness of those pixels in the image represented by the image signal which are determined by the region decision circuit to be within the region subject to correction;

an offset subtraction circuit for subtracting the offset level generated by the offset level generation circuit from the image signal to generate an offset image signal;

a gain generation circuit for generating a gain for the offset image signal; and a gain multiplication circuit for multiplying the offset image signal by the gain to generate a corrected image signal.

Effects of the Invention

The present invention can improve the contrast of a subject having a narrow brightness signal distribution because, for example, the subject is shrouded in fog, without causing black collapse in a low brightness image region due to a window frame or the like visible in front of the subject.

MODE FOR CARRYING OUT THE INVENTION

First Embodiment

Figure 1:
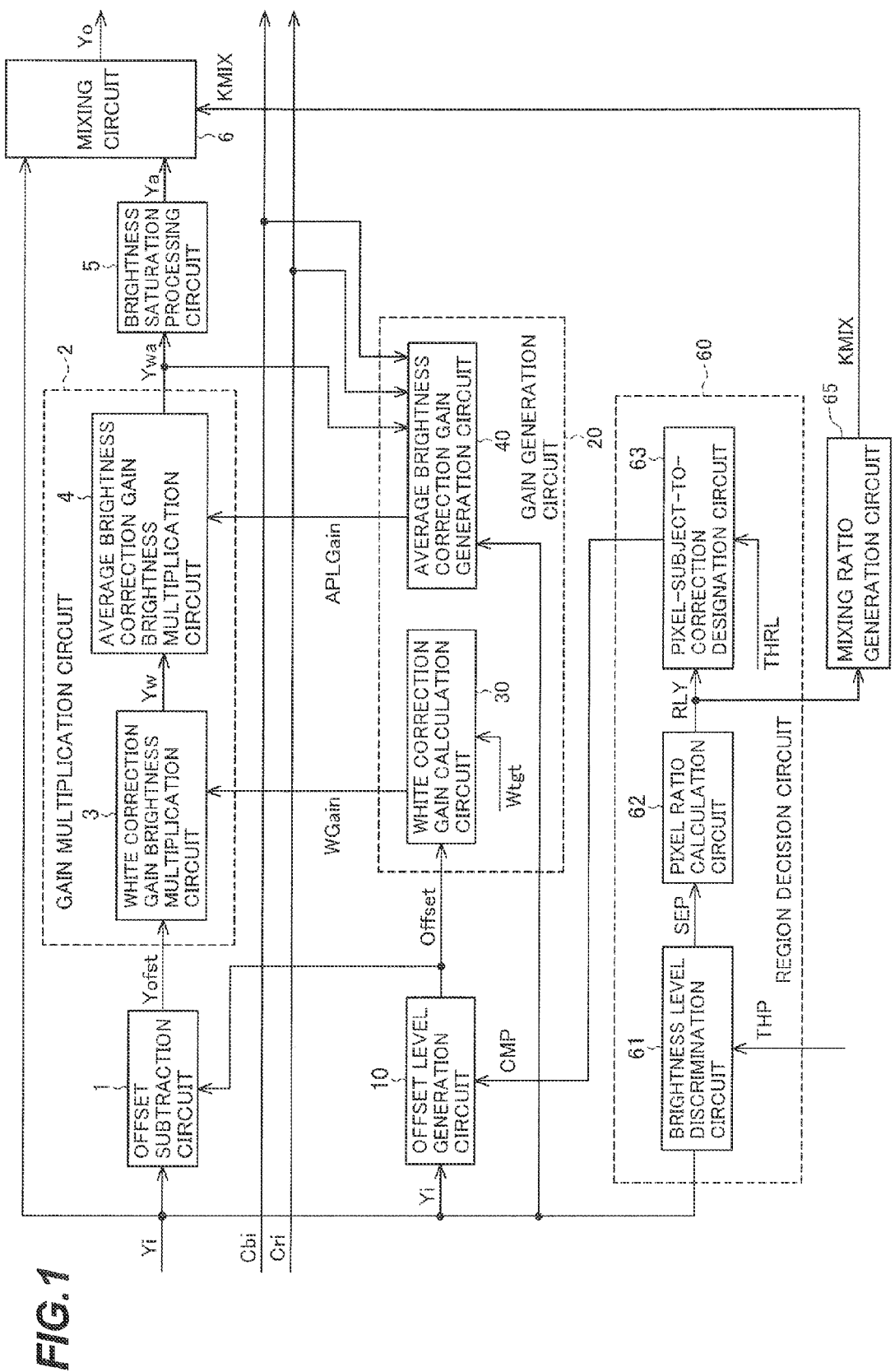
FIG. 1 is a block diagram schematically showing the configuration of an image processing device according to a first embodiment of the invention.

FIG. 1 shows the configuration of an image processing device according to a first embodiment of the invention.

The illustrated image processing device receives the brightness signal Yi and color difference signals Cbi, Cri of each pixel forming an image and carries out gradation corrections of the brightness signal Yi of the image. The brightness signal Yi and color difference signals Cbi, Cri of each pixel will also be referred to simply as input signals. The image processing device takes a plurality of pixels in turn as a pixel of interest and outputs a corrected brightness signal Yo for the pixel of interest together with the input color difference signals Cbi, Cri as they are (with no correction applied).

The illustrated image processing device includes an offset subtraction circuit 1, a gain multiplication circuit 2, a brightness saturation processing circuit 5, a mixing circuit 6, an offset level generation circuit 10, a gain generation circuit 20, a region decision circuit 60, and a mixing ratio generation circuit 65.

The offset subtraction circuit 1 subtracts an offset level Offset generated by the offset level generation circuit 10, from the brightness signal Yi of the input image to obtain a brightness signal Yofst.

That is, the offset subtraction circuit 1 subtracts the offset level Offset generated by the offset level generation circuit 10, from the image signal to generate an offset image signal. The image signal here is the brightness signal Yi. The offset image signal is the brightness signal Yofst.

Figure 2:
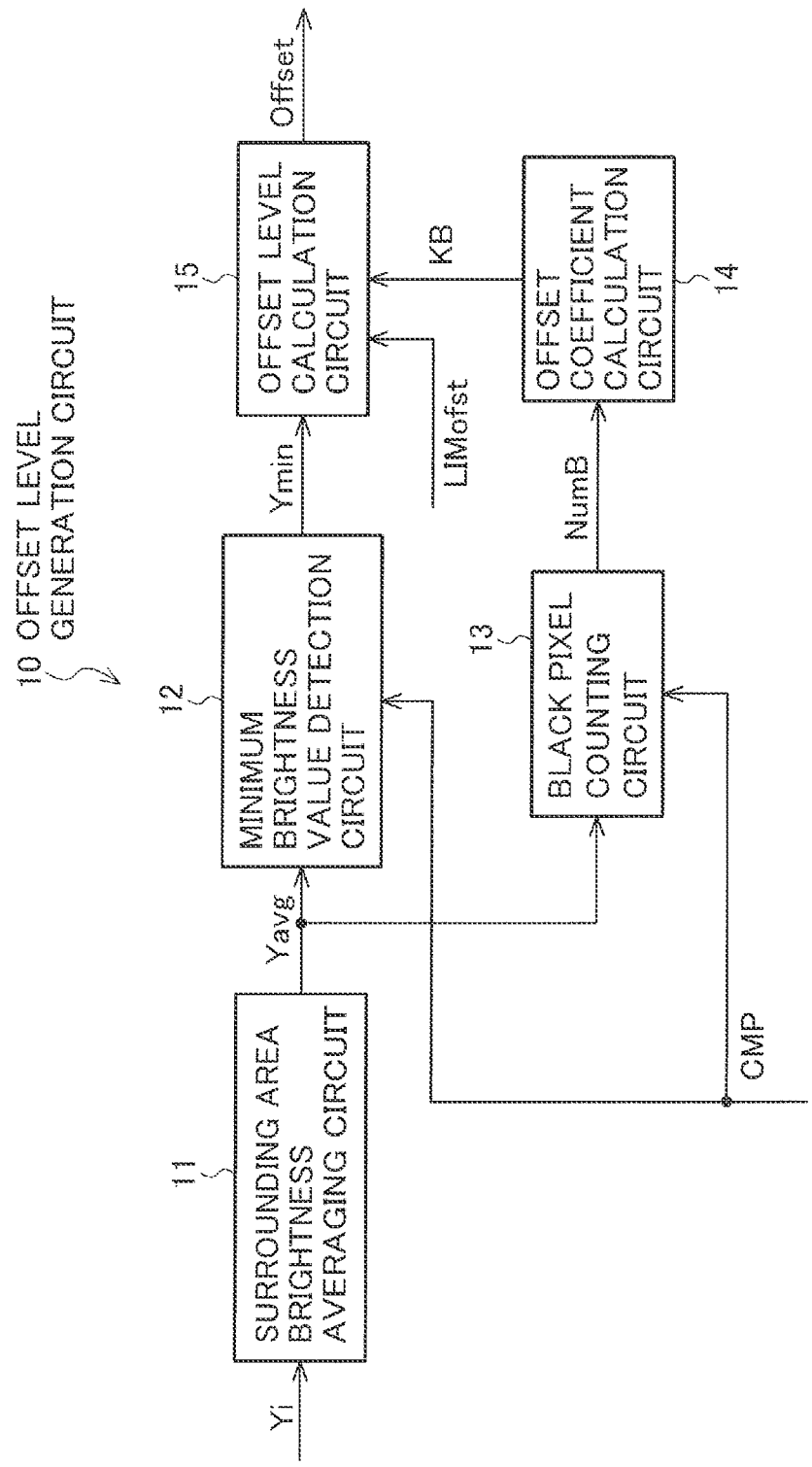
FIG. 2 is a block diagram showing an example of the configuration of the offset level generation circuit in FIG. 1.

As shown in FIG. 2, the offset level generation circuit 10 includes a surrounding area brightness averaging circuit 11, a minimum brightness value detection circuit 12, a black pixel counting circuit 13, an offset coefficient calculation circuit 14, and an offset level calculation circuit 15.

The gain multiplication circuit 2 multiplies the brightness signal Yofst output from the offset subtraction circuit 1 by a gain generated by the gain generation circuit 20. The gain generation circuit 20 generates the gain for the offset image signal. The offset image signal here is the brightness signal Yofst.

The gain multiplication circuit 2 includes a white correction gain brightness multiplication circuit 3 and an average brightness correction gain brightness multiplication circuit 4. The gain generation circuit 20 includes a white correction gain calculation circuit 30 and an average brightness correction gain generation circuit 40. By multiplying the offset image signal (brightness signal Yofst) by the gain, the gain multiplication circuit 2 generates a corrected image signal Ywa.

The white correction gain brightness multiplication circuit 3 multiplies the brightness signal Yofst output from the offset subtraction circuit 1 by a white correction gain WGain determined by the white correction gain calculation circuit 30 to obtain a post-white-correction brightness signal Yw. That is, the white correction gain brightness multiplication circuit 3 multiplies the offset image signal by the white correction gain WGain to generate the white-corrected image signal Yw. The offset image signal here is the brightness signal Yofst.

The average brightness correction gain brightness multiplication circuit 4 multiplies the brightness signal Yw output from the white correction gain brightness multiplication circuit 3 by an average brightness correction gain APLGain generated by the average brightness correction gain generation circuit 40 to obtain a post-average-brightness-correction brightness signal Ywa. That is, the average brightness correction gain brightness multiplication circuit 4 multiplies the white corrected image signal by the average brightness correction gain APLGain to generate an average brightness corrected image signal Ywa. The white corrected image signal here is the brightness signal Yw.

Figure 3:
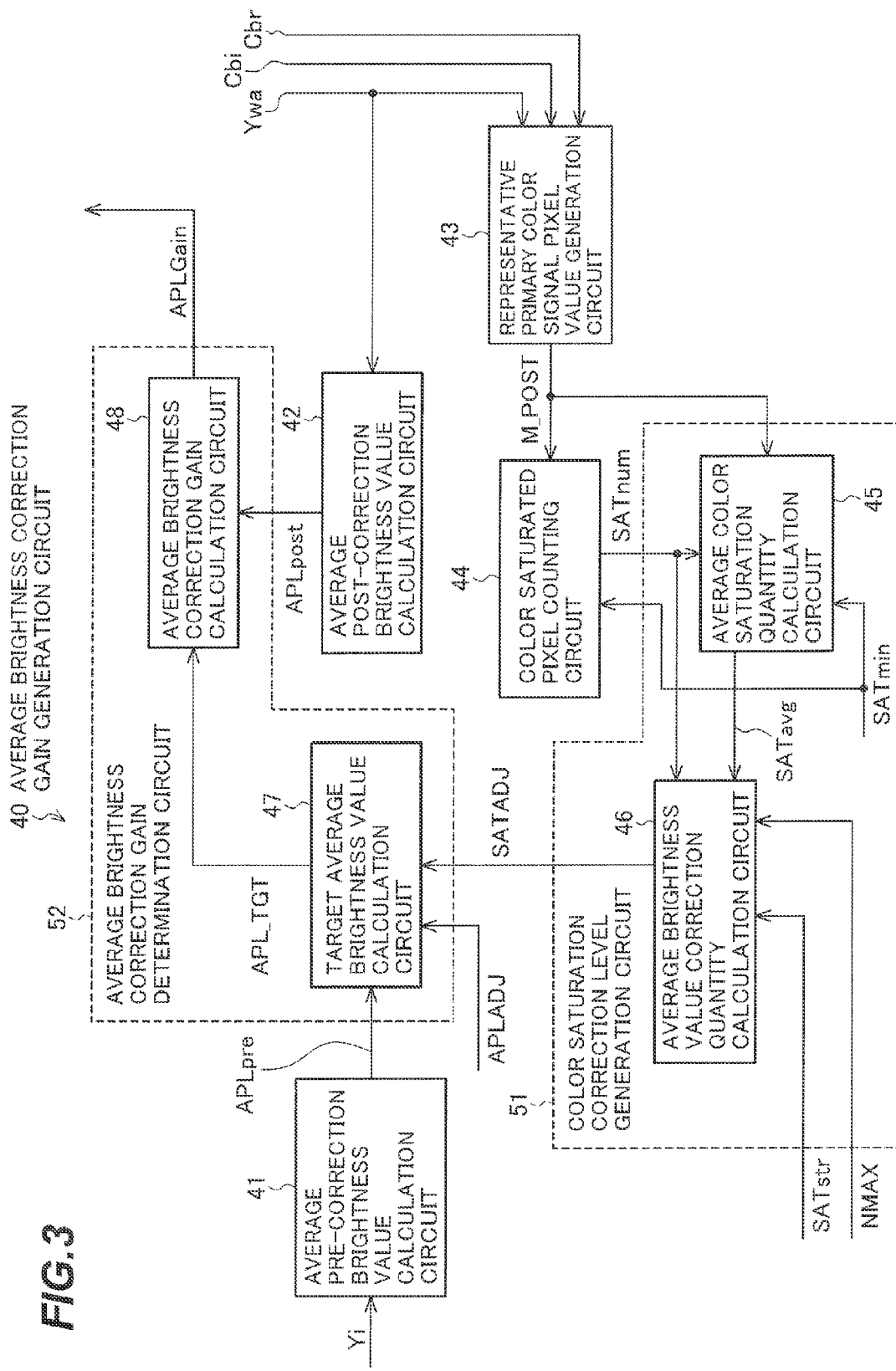
FIG. 3 is a block diagram showing an example of the configuration of the average brightness correction gain generation circuit in FIG. 1.

As shown in FIG. 3, the average brightness correction gain generation circuit 40 includes an average pre-correction brightness value calculation circuit 41, an average post-correction brightness value calculation circuit 42, a representative primary color signal pixel value generation circuit 43, a color saturated pixel counting circuit 44, a color saturation correction level generation circuit 51, a target average brightness value calculation circuit 47, and an average brightness correction gain calculation circuit 48.

The color saturation correction level generation circuit 51 includes an average color saturation quantity calculation circuit 45 and an average brightness value correction quantity calculation circuit 46. The color saturation correction level generation circuit 51 generates a color saturation correction level SATADJ on the basis of the number of color saturated pixels SATnum and a maximum value M_POST.

The average brightness correction gain generation circuit 40 generates an average brightness correction gain APLGain on the basis of the average brightness value APLpre of the image signal, the average brightness value APLpost of the corrected image signal, and the color saturation correction level SATADJ.

The brightness saturation processing circuit 5 performs saturation processing on the brightness signal Ywa output from the average brightness correction gain brightness multiplication circuit 4 and outputs a saturation processed brightness signal Ya.

The mixing circuit 6 mixes the brightness signal Yi of the input image and the saturation processed brightness signal Ya, output from the brightness saturation processing circuit 5, in accordance with a mixing ratio KMIX determined by the mixing ratio generation circuit 65 and produces an output brightness signal Yo. The mixing circuit 6 mixes the image signal and the corrected image signal on the basis of the mixing ratio KMIX. The image signal here is the brightness signal Yi of the input image. The corrected image signal is the saturation processed brightness signal Ya.

If the mixing ratio is given in percent, the mixing in the mixing circuit 6 is expressed as follows:

$$Yo = Yi \times KMIX/100 + Ya \times (100 - KMIX)/100 \quad (1)$$

The offset level generation circuit 10 generates the offset level (Offset) for each pixel determined by the region decision circuit 60 to be subject to correction, among the pixels forming the input image, on the basis of the average brightness in the area surrounding the above mentioned each pixel.

That is, the offset level generation circuit 10 generates the offset level Offset on a basis of the brightness of those pixels in the image represented by the image signal which are determined by the region decision circuit 60 to be within the region subject to correction.

The white correction gain calculation circuit 30 generates a white correction gain WGain for each pixel on the basis of the offset level Offset generated by the offset level generation circuit 10 and a predetermined target upper limit Wtgt. That is, the white correction gain calculation circuit 30 generates the white correction gain WGain on the basis of the offset level Offset of the image signal and the predetermined target upper limit Wtgt.

The average brightness correction gain generation circuit 40 generates an average brightness correction gain APLGain on the basis of the brightness signal Yi and color difference signals Cbi, Cri of the input image and the post-average-brightness-correction brightness signal Ywa.

The mixing ratio generation circuit 65 generates the mixing ratio KMIX for each pixel on the basis of the proportion (RLY) of low brightness pixels to the pixels surrounding the above mentioned each pixel. That is, the mixing ratio generation circuit 65 generates the mixing ratio for each pixel of the image represented by the image signal on the basis of the low brightness pixel ratio which is the proportion of pixels having at most the predetermined brightness level to the pixels surrounding the above mentioned each pixel.

The region decision circuit 60, mixing ratio generation circuit 65, offset level generation circuit 10, white correction gain calculation circuit 30, and average brightness correction gain generation circuit 40 will next be described in detail, taking them in this order.

Figure 4:
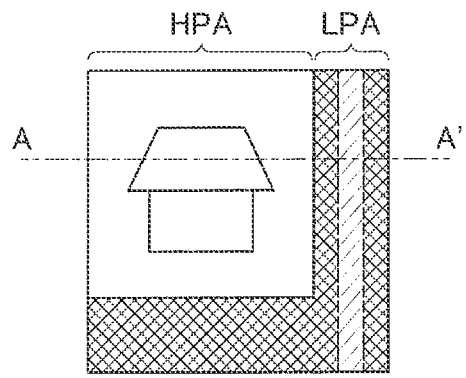
FIG. 4 is a schematic drawing showing an exemplary input image in the first embodiment.

The input image in the following description is assumed to be the image shown in FIG. 4. FIG. 4 schematically shows an exemplary image obtained when a picture of a house shrouded in fog is taken through a window. The part LPA including the window frame visible in the image is a region having a low brightness level (low brightness region); the remaining part HPA (the part seen through the window) is a region having a relatively high brightness level (non-low brightness region). In the illustrated example, the house visible in the non-low brightness region HPA has low contrast and a correction to increase the contrast is desired.

The region decision circuit 60 decides whether each pixel of the image represented by the brightness signal Yi belongs to the region subject to correction, in which the frequency of appearance of pixels having a predetermined brightness level or less is equal to or less than a predetermined value.

That is, the region decision circuit 60 decides whether each pixel of the image represented by the image signal is disposed within the region subject to correction, in which pixels having at most a predetermined brightness level appear with a frequency equal to or less than the predetermined value. The image signal here is the brightness signal Yi.

The region decision circuit 60 includes a brightness level discrimination circuit 61, a pixel ratio calculation circuit 62, and a pixel-subject-to-correction designation circuit 63.

The brightness level discrimination circuit 61 compares the brightness signal Yi of each pixel of the input image with a predetermined brightness level THP and outputs a signal SEP indicating the result of this discrimination. That is, the brightness level discrimination circuit 61 compares the pixel value of each pixel of the image represented by the image signal with the predetermined brightness level THP and identifies pixels having at most the predetermined brightness level THP. The image signal here is the brightness signal Yi.

Figure 5:
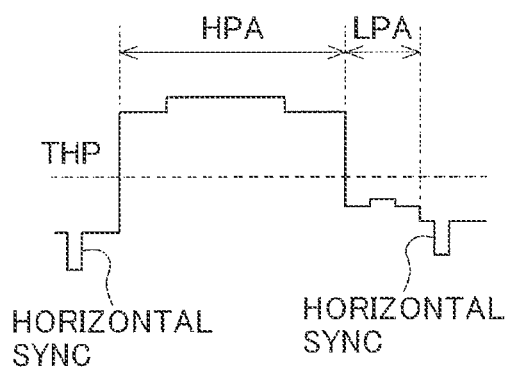
FIG. 5 is a diagram showing a signal waveform obtained when the input image in FIG. 4 is captured.

FIG. 5 is a diagram showing a signal waveform obtained from the input image on line A-A' in FIG. 4.

In the signal in the non-low brightness region HPA, the signal corresponding to the roof of the house shrouded in fog has a low amplitude. The signal in the low brightness region LPA also includes a low amplitude part, corresponding to the window frame.

The brightness level discrimination circuit 61 compares the value of each pixel of the brightness signal Yi as shown in FIG. 5 with the predetermined brightness level (threshold) THP and outputs a binary state signal SEP indicating the result: '1' indicates that the pixel value is equal to or less than the threshold THP (low brightness pixel); '0' indicates that the pixel value exceeds the threshold THP (non-low brightness pixel).

To avoid noise effects, the brightness signal Yi may be passed through a low pass filter in the input stage of the brightness level discrimination circuit 61 so that it is processed by surrounding pixel averaging process or the like before being compared with the threshold.

Figure 6:
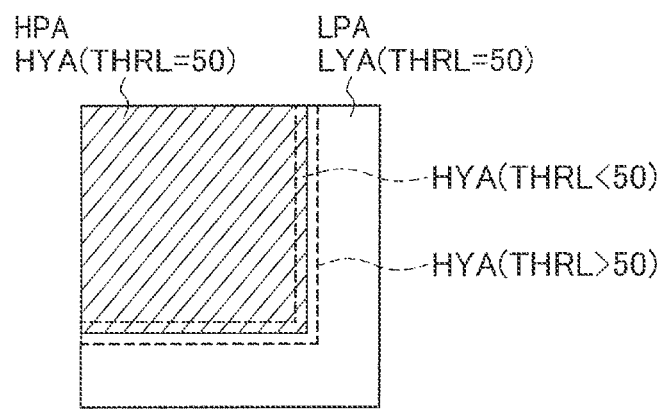
FIG. 6 is a diagram showing the distribution of state signals corresponding to the exemplary input image in the first embodiment.

The discrimination result output (state signal) SEP is shown in correspondence to the image in FIG. 6. In FIG. 6, the hatched area HPA is a region occupied by non-low brightness pixels (non-low brightness region), and the white area (non-hatched area) LPA is a region occupied by low brightness pixels (low brightness region).

The brightness level discrimination circuit 61 supplies the state signal SEP to the pixel ratio calculation circuit 62.

The pixel ratio calculation circuit 62 receives the state signal SEP from the brightness level discrimination circuit 61, takes each pixel of the image in turn as the pixel of interest, calculates the proportion of low brightness pixels in a predetermined surrounding pixel range centered on the pixel of interest, and outputs the calculated proportion as (data indicating) a low brightness pixel ratio RLY. That is, the pixel ratio calculation circuit 62 takes each pixel of the image represented by the image signal in turn as a pixel of interest, and calculates the proportion of those pixels in the predetermined range of surrounding pixels centered on the pixel of interest which are determined by the brightness level discrimination circuit 61 as having at most the predetermined brightness level THP, as the low brightness pixel ratio RLY.

The operation of the pixel ratio calculation circuit 62 will be described in detail with reference to FIGS. 7(a) to 7(c).

Figure 7A:
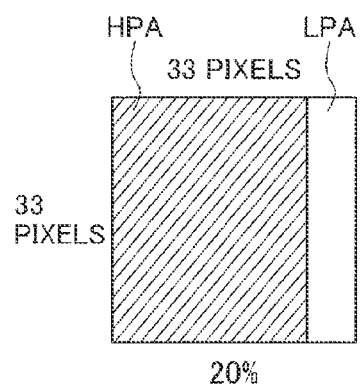
FIGS. 7(a) to 7(c) are diagrams showing different exemplary arrangements of low brightness pixels and non-low brightness pixels in a surrounding pixel block centered on a pixel of interest.
Figure 7B:
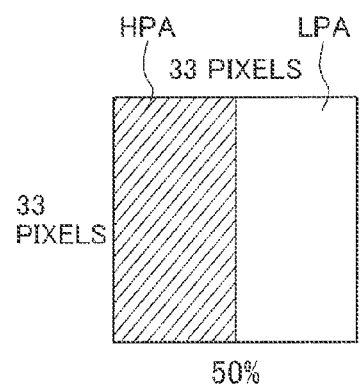
Figure 7C:
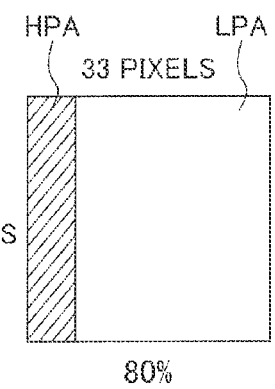

FIGS. 7(a) to 7(c) show a surrounding pixel block formed of a rectangular area measuring 33 pixels in the horizontal direction and 33 pixels in the vertical direction, centered on a pixel of interest positioned on the boundary of the low brightness region LPA and the non-low brightness region HPA shown in FIG. 6. It is assumed here that the low brightness region LPA includes only low brightness pixels and that the non-low brightness region HPA includes only non-low brightness pixels.

In the surrounding pixel block shown in FIG. 7(a), 218 of 1089 pixels are low brightness pixels, and the low brightness pixel ratio RLY is about 20%.

In the surrounding pixel block shown in FIG. 7(b), 545 of 1089 pixels are low brightness pixels, and the low brightness pixel ratio RLY is about 50%.

In the surrounding pixel block shown in FIG. 7(c), 871 of 1089 pixels are low brightness pixels, and the low brightness pixel ratio RLY is about 80%.

The actual circuit may use the number of low brightness pixels directly as an index indicating the low brightness pixel ratio, instead of the percentage.

The pixel ratio calculation circuit 62 supplies (data indicating) the low brightness pixel ratio RLY to the pixel-subject-to-correction designation circuit 63 and mixing ratio generation circuit 65.

The pixel-subject-to-correction designation circuit 63 determines that a pixel is subject to correction if the low brightness pixel ratio RYL output for the pixel from the pixel ratio calculation circuit 62 is equal to or less than a predetermined threshold THRL and outputs a subject-to-correction identification signal CMP indicating the result of this determination. That is, the pixel-subject-to-correction designation circuit 63 decides that each pixel is disposed within the region subject to correction if the low brightness pixel ratio RLY of the pixel is equal to or less than the predetermined threshold THRL and outputs a signal indicating the decision result as the subject-to-correction identification signal CMP.

The set of pixels subject to correction forms a region subject to correction HYA, and the set of pixels other than the pixels subject to correction forms a region not subject to correction LYA.

The threshold THRL is set to 50%, for example.

If the threshold THRL is set to 50%, the region subject to correction HYA and the region not subject to correction LYA respectively match the non-low brightness region HPA and the low brightness region LPA. To indicate this, in FIG. 6 reference characters HPA are accompanied by the reference characters HYA (THRL=50) and reference characters LPA are accompanied by LYA (THRL=50).

If the threshold THRL is set to a value lower than 50%, the region subject to correction HYA becomes narrower than the non-low brightness region HPA, as indicated by the reference characters HYA (THRL<50) in FIG. 6.

If the threshold THRL is set to a value higher than 50%, the region subject to correction HYA becomes wider than the non-low brightness region HPA as indicated by the reference characters HYA (THRL>0.50) in FIG. 6.

The subject-to-correction identification signal CMP is supplied to the minimum brightness value detection circuit 12 and black pixel counting circuit 13.

The mixing ratio generation circuit 65 converts the low brightness pixel ratio RLY output from the pixel ratio calculation circuit 62 in accordance with a predetermined conversion characteristic to generate a mixing ratio KMIX. That is, the mixing ratio generation circuit 65 generates the mixing ratio KMIX by converting the low brightness pixel ratio RYL calculated by the pixel ratio calculation circuit 62, in accordance with the predetermined characteristic.

Figure 8:
FIG. 8 is a diagram indicating the low brightness pixel ratio for pixels on line A-A' in FIG. 4.

The low brightness pixel ratio RLY for each of the pixels on the line A-A' in the input image shown in FIG. 4 is as in FIG. 8, for example. That is, when the block of pixels surrounding the pixel includes only pixels in the non-low brightness region HPA (which is assumed to include only non-low brightness pixels), the ratio is 0%; when the block of pixels surrounding the pixel includes only pixels in the low brightness region LPA (which is assumed to include only low brightness pixels), the ratio is 100%; when the block of pixels surrounding the pixel includes both pixels in the non-low brightness region HPA and pixels in the low brightness region LPA, the ratio varies from 0% to 100%, depending on the ratios of the areas in the non-low brightness region HPA and low brightness region LPA.

The mixing ratio generation circuit 65 has a conversion characteristic such that when the low brightness pixel ratio RLY is equal to or more than a predetermined upper limit, the mixing ratio KMIX is 100%; when the low brightness pixel ratio RLY is within the range from 0% to the upper limit, the mixing ratio KMIX increases linearly from 0% to 100% as the low brightness pixel ratio RLY increases.

The mixing ratio generation circuit 65 may alternatively have a conversion characteristic such that when the low brightness pixel ratio RLY is equal to or less than a predetermined lower limit, the mixing ratio KMIX is 0%; when the low brightness pixel ratio RLY is within the range from the lower limit to 100%, the mixing ratio KMIX increases linearly from 0% to 100% as the low brightness pixel ratio RLY increases.

The operation an exemplary mixing ratio generation circuit 65 will be described with reference to FIGS. 9 and 10(a) to 10(c).

Figure 9:
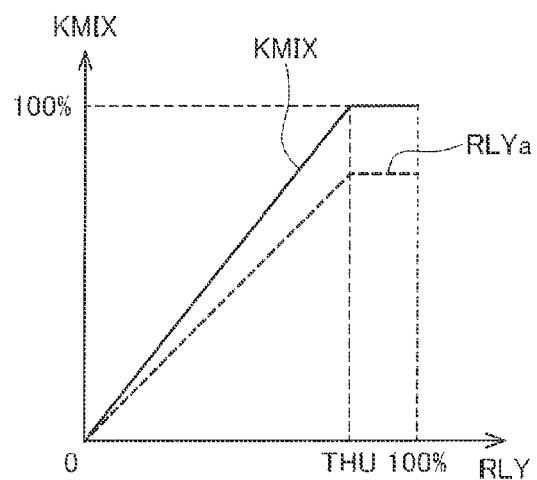
FIG. 9 is a graph showing input-output characteristic of an example of the mixing ratio generation circuit in FIG. 1.

FIG. 9 shows the input-output characteristic (conversion characteristic) of the exemplary mixing ratio generation circuit 65. The conversion characteristic shown in FIG. 9 causes the mixing ratio KMIX to be 100% if the low brightness pixel ratio RLY is equal to or more than a predetermined upper limit THU and causes the mixing ratio KMIX to increase linearly from 0% to 100% as the low brightness pixel ratio RLY increases in the range from 0% to the upper limit THU.

Figure 10A:
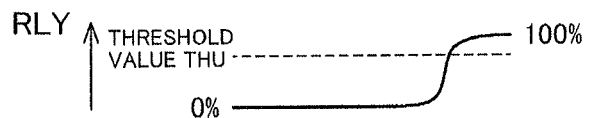
FIGS. 10(a) to 10(c) are diagrams illustrating the mixing ratio output from the example of the mixing ratio generation circuit in FIG. 1.
Figure 10B:
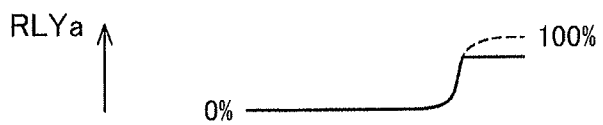
Figure 10C:

FIGS. 10(a) to 10(c) illustrate the process of conversion from the low brightness pixel ratio RLY to the mixing ratio KMIX for input image pixels on the line A-A' shown in FIG. 4 when the mixing ratio generation circuit 65 has the input-output characteristic shown in FIG. 9.

Like FIG. 8, FIG. 10(a) shows the low brightness pixel ratio RLY input from the pixel ratio calculation circuit 62.

The mixing ratio generation circuit 65 compares the low brightness pixel ratio RLY input from the pixel ratio calculation circuit 62 with the predetermined upper limit THU, clips the part exceeding the upper limit THU as indicated by the dashed line RLYa in FIG. 9 or as shown in FIG. 10(b), and replaces all of that part with the upper limit THU. The part from 0% to the upper limit THU is then stretched to extend from 0% to 100% as indicated by the solid line KMIX in FIG. 9 or as shown in FIG. 10(c). That is, the corresponding mixing ratio KMIX is obtained by stretching the part up to the upper limit THU by a factor of 100%/THU.

Accordingly, the conversion from RLY to KMIX is expressed as follows:

If RLY > THU, then
KMIX = 100%
If RLY ≤ THU, then
KMIX = RLY × (100%/THU).

If clipping causes a discontinuity in the variation of the proportions, a further conversion (adjustment) such as averaging the neighboring mixing ratios may be carried out to make the proportions vary continuously.

The operation of another exemplary mixing ratio generation circuit 65 will be described with reference to FIG. 11 and FIGS. 12(a) to 12(c).

Figure 11:
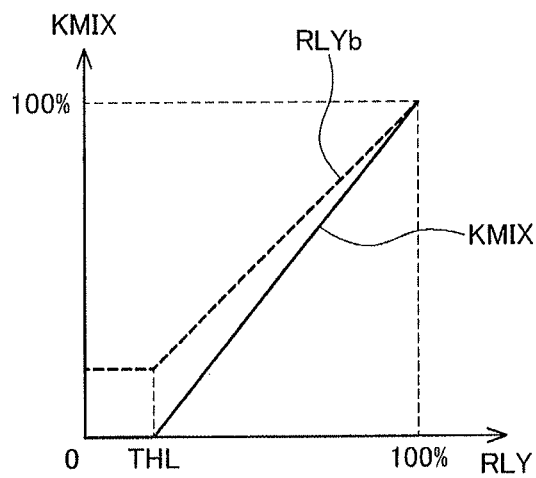
FIG. 11 is a graph showing input-output characteristic of an example of the mixing ratio generation circuit in FIG. 1.

FIG. 11 shows the input-output characteristic (conversion characteristic) of the exemplary mixing ratio generation circuit 65. With the conversion characteristic shown in FIG. 11, if the low brightness pixel ratio RLY is equal to or less than a predetermined lower limit THL, the mixing ratio KMIX becomes 0%; and if the low brightness pixel ratio RLY is in the range from the predetermined lower limit THL to 100%, the mixing ratio KMIX increases linearly from 0% to 100% as the low brightness ratio RLY increases.

Figure 12A:
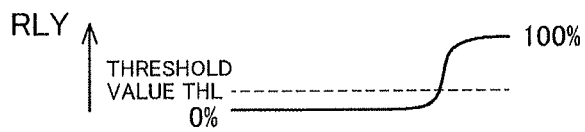
FIGS. 12(a) to 12(c) are diagrams illustrating the mixing ratio output from the example of the mixing ratio generation circuit in FIG. 1.
Figure 12B:
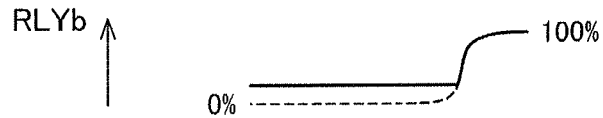
Figure 12C:

FIGS. 12(a) to 12(c) illustrate the process of conversion from the low brightness pixel ratio RLY to the mixing ratio KMIX for pixels of the input image on line A-A' shown in FIG. 4 when the mixing ratio generation circuit 65 has the input-output characteristic shown in FIG. 11.

Like FIG. 8, FIG. 12(a) shows the low brightness pixel ratio RLY input from the pixel ratio calculation circuit 62.

The mixing ratio generation circuit 65 compares the low brightness pixel ratio RLY input from the pixel ratio calculation circuit 62 with a predetermined lower limit THL, clips the part below the lower limit THL as indicated by the dashed line RLYb in FIG. 11 or as shown in FIG. 12(b), and replaces all of that part with the lower limit THL. The part from the lower limit THL to 100% is then stretched to extend from 0% to 100% as indicated by the solid line KMIX in FIG. 11 or as shown in FIG. 12(c). That is, the corresponding mixing ratio KMIX is obtained by stretching the part between the lower limit THL and 100% by a factor of 100%/(100%−THL).

Accordingly, the conversion from RLY to KMIX is expressed as follows:

If RLY < THU, then
KMIX = 0%
If RLY ≥ THU, then
KMIX = 100% − (100% − RLY) × (100%/(100% − THL))
     = 100%(RLY − THL)/(100% − THL)

If clipping causes a discontinuity in the variation of the proportions, a further conversion (adjustment) such as averaging the surrounding mixing ratios may be carried out to make the proportions vary continuously.

As shown in FIG. 9, if the low brightness pixel ratio RLY is equal to or more than the upper limit THU, the mixing ratio generation circuit 65 generates a mixing ratio KMIX of 100%; if the low brightness pixel ratio RLY is less than the upper limit THU, the mixing ratio generation circuit 65 multiplies the low brightness pixel ratio RLY by a factor (100/THU) to obtain a mixing ratio KMIX, so that in the part of the image where the low brightness pixel ratio is close to 100% (to the right of the upper limit THU in FIG. 9), the input image can be output directly without being mixed with the corrected image signal Ya.

As shown in FIG. 11, if the low brightness pixel ratio RLY is equal to or less than the lower limit THL, the mixing ratio generation circuit 65 generates a mixing ratio KMIX of 0%; if the low brightness pixel ratio RLY exceeds the lower limit THL, the mixing ratio generation circuit 65 generates a mixing ratio KMIX by expanding the difference between the low brightness pixel ratio RLY exceeding the lower limit THL and 100% by a factor of 100%/(100%−THL), so that in the part of the image where the low brightness pixel ratio is close to 0% (to the left of THL in FIG. 11), the corrected image can be output directly without being mixed with the input image signal Yi.

Although an example in which the upper limit THU is used as an upper clipping value and an example in which the lower limit THL is used as a lower clipping value have been described with reference to FIGS. 9, 10(a) to 10(c), 11, and 12(a) to 12(c), the upper limit THU and the lower limit THL may both be used as, respectively, upper and lower clipping values and the clipped data may then be expanded to range from 0% to 100%.

Figure 13:
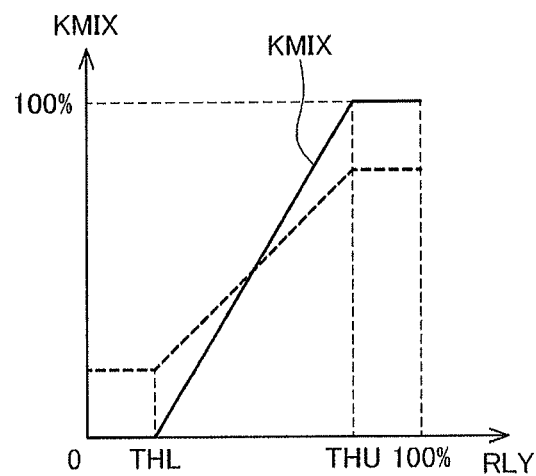
FIG. 13 is a graph showing input-output characteristic of an example of the mixing ratio generation circuit in FIG. 1.

In that case, the relationship between the low brightness ratio RLY and the mixing ratio KMIX is as shown in FIG. 13.

The mixing ratio generation circuit 65 may output the input pixel ratio RLY directly as the mixing ratio KMIX.

(Data indicating) the mixing ratio KMIX obtained by conversion is supplied to the mixing circuit 6.

As described above, by excluding a pixel of interest from the pixels subject to correction if the ratio of pixels determined to have a predetermined value THP or less (low brightness pixels) in a predetermined surrounding pixel range centered on the pixel of interest exceeds a predetermined threshold THRL, and determining that a pixel is subject to correction if the ratio RLY of low brightness pixels in the surrounding pixel range is equal to or less than the predetermined threshold THRL, clusters of low brightness pixels can be excluded, and clusters of non-low brightness pixels can be treated as pixels subject to correction. Therefore, the offset and gain can be determined with consideration given to low brightness pixels included in clustered areas of non-low brightness pixels but without being affected by the presence of non-low brightness pixels in clustered areas of low brightness pixels, and contrast can be improved appropriately.

Since the mixing ratio KMIX of the corrected image signal Ya and the input image signal Yi is varied for each pixel, depending on the low brightness pixel ratio RLY determined with consideration to the brightness of surrounding pixels, sudden changes in the amount of correction to the input image can be avoided even on the boundary of the region subject to correction and the low brightness region, and an output image that does not appear strange can be obtained.

The surrounding area brightness averaging circuit 11 in the offset level generation circuit 10 in FIG. 2 receives the brightness signal Yi of the input image, takes each pixel in turn as a pixel of interest, and calculates an average surrounding area brightness value Yavg for the pixel of interest. That is, the surrounding area brightness averaging circuit 11 calculates the average value of the brightness signal values of the pixels in the surrounding area NA centered on the pixel of interest P0 and outputs the average value as the surrounding area brightness value Yavg of the pixel of interest P0.

That is, the surrounding area brightness averaging circuit 11 takes each pixel of the image signal as a pixel of interest, and calculates an average surrounding area pixel value for the pixel of interest. The image signal here is the brightness signal Yi. The average surrounding area pixel value is the average surrounding area brightness value Yavg.

Figure 14:
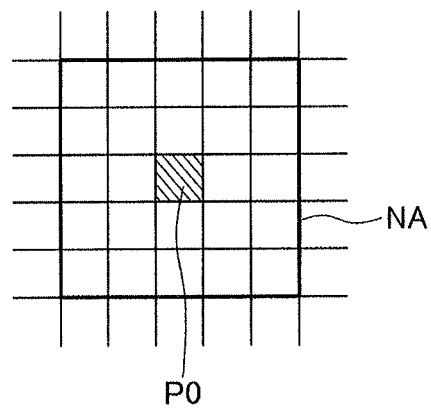
FIG. 14 is a diagram showing the region occupied by the pixels used for taking the average in the surrounding area brightness averaging circuit in FIG. 2.

For instance, the surrounding area NA is a rectangular area measuring five pixels in the horizontal direction and five pixels in the vertical direction centered on the pixel of interest P0, as shown in FIG. 14, and an average value of the brightness signal values of the twenty-five pixels included in the surrounding area NA is calculated as the average surrounding area brightness value Yavg of the pixel of interest P0.

The number of pixels in the surrounding area that are used by the surrounding area brightness averaging circuit 11 to obtain the average surrounding area brightness is not limited to 5×5 pixels. The size of the area should be determined in accordance with the S/N ratio of the brightness signal of the input image and the memory resources and so on of the hardware implementing the image processing device. If the area is large, the effect of the noise component included in the brightness signal can be reduced. If the area is too large, however, the weight of the brightness of the pixel of interest in the calculated average surrounding area brightness value Yavg is reduced, and image sharpness is lost.

The average surrounding area brightness value Yavg output from the surrounding area brightness averaging circuit 11 is supplied to the minimum brightness value detection circuit 12 and black pixel counting circuit 13.

The minimum brightness value detection circuit 12 outputs the minimum value of the average surrounding area brightness values Yavg generated by the surrounding area brightness averaging circuit 11 for the respective pixels in the region subject to correction HYA as a minimum brightness value Ymin. Whether or not the average surrounding area brightness value Yavg is for a pixel in the region subject to correction HYA is determined here from the subject-to-correction identification signal CMP.

That is, the minimum brightness value detection circuit 12 detects the minimum value of the average surrounding pixel values obtained for the pixels of the input image, in the region subject to correction HYA consisting of pixels determined by the region decision circuit 60 to be subject to correction. The average surrounding pixel value here is the average surrounding area brightness value Yavg. The minimum value is the minimum brightness value Ymin.

The minimum brightness value Ymin is supplied to the offset level calculation circuit 15.

The black pixel counting circuit 13 compares the average surrounding area brightness value Yavg generated by the surrounding area brightness averaging circuit 11 for each pixel with a predetermined threshold BmAx, counts the number of pixels subject to correction that are determined to be equal to or less than the threshold BmAx, and outputs the resulting count as the number of black pixels NumB. Whether or not a pixel is subject to correction is determined from the subject-to-correction identification signal CMP.

That is, the black pixel counting circuit 13 counts the number of black level pixels in each frame having an average surrounding pixel value equal to or less than a predetermined level. The average surrounding pixel value here is the average surrounding area brightness value Yavg. The predetermined level is the threshold BmAx. The result of counting the black level pixels is the number of black pixels NumB.

The threshold BmAx is set to a value equal to or greater than the upper limit of the gradation range displayed as black in the frame.

The offset coefficient calculation circuit 14 calculates an offset coefficient KB corresponding to the number of black pixels NumB output from the black pixel counting circuit 13 for each frame.

That is, the offset coefficient calculation circuit 14 generates the offset coefficient KB on the basis of the number of black level pixels. The number of black level pixels here is the number of black pixels NumB.

Figure 15:
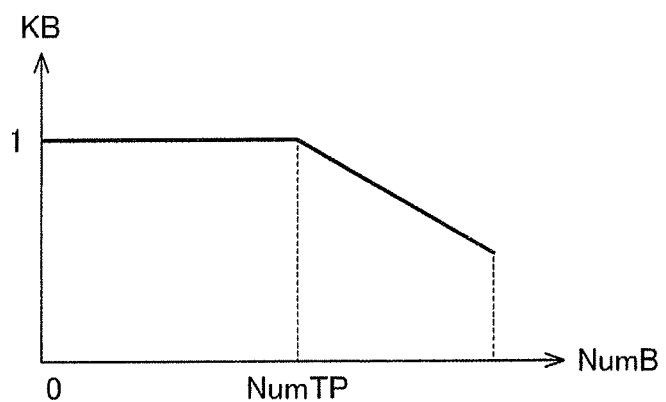
FIG. 15 is a diagram illustrating the relation between the number of black pixels NumB input to the offset coefficient calculation circuit in FIG. 2 and the offset coefficient KB output therefrom.

FIG. 15 illustrates an exemplary relation between the number of black pixels NumB and the offset coefficient KB calculated therefrom.

In the example shown in FIG. 15, the offset coefficient KB is held to 1 if the number of black pixels NumB does not exceed a predetermined value NumTP. If the number of black pixels NumB is greater, the offset coefficient KB is less than 1, and the number of black pixels NumB increases, the offset coefficient KB decreases.

The offset coefficient KB is input to the offset level calculation circuit 15.

For an image including a large number of black pixels NumB, the offset level Offset is reduced by reducing the offset coefficient KB, as described later. Very foggy images often have a brightness signal distribution biased toward the high brightness side and do not often have a large number of black pixels NumB. Images little affected by fog often have a large number of black pixels NumB, and these images do not need gradation correction to expand the brightness signal distribution. The configuration described above can suppress excessive gradation corrections that would excessively expand the brightness signal distribution of images not including fog effects or the like.

The offset level calculation circuit 15 calculates an offset level Offset from the minimum brightness value Ymin output from the minimum brightness value detection circuit 12 for each frame, the offset coefficient KB output from the offset coefficient calculation circuit 14 for each frame, and a predetermined threshold LIMofst.

That is, the offset level calculation circuit 15 calculates the offset level Offset on the basis of the minimum value and the offset coefficient KB. The minimum value here is the minimum brightness value Ymin.

When the offset level Offset is calculated, first a target offset level Offset_tgt is obtained, and next the offset level Offset is obtained from the target offset level.

The target offset level Offset_tgt is calculated for each frame in accordance with equation (2A) or (2B) below.

The predetermined threshold LIMofst is specified to suppress the occurrence of false contours caused by the expansion of the brightness signal distribution when the distribution is biased toward the high brightness side. The target offset level Offset_tgt is limited by the threshold LIMofst as indicated below.

$$\text{If } Y_{min} \times KB < LIMofst,$$
$$Offset\_tgt = Y_{min} \times KB \quad (2A)$$
$$\text{If } Y_{min} \times KB \geq LIMofst,$$
$$Offset\_tgt = LIMofst \quad (2B)$$

The target offset level Offset_tgt is calculated for each frame and can be expected to vary considerably from frame to frame. To reduce the effect of these variations, the exponential smoothing process expressed by equation (3) is performed by using an exponential smoothing coefficient Kofst (with a value between 0 and 1, inclusive). In equation (3), Offset_tgt(t) is the target offset level calculated for a given frame, and Offset_tgt(t−1) is the target offset level calculated one frame before.

$$Offset = Kofst \times Offset\_tgt(t)$$
$$+ (1 - Kofst) \times Offset\_tgt(t-1) \quad (3)$$

The calculated offset level Offset is input to the offset subtraction circuit 1.

An effect obtained from the configuration described above is that even if the target offset level of the input image varies greatly from frame to frame, variations in the level of the brightness signal in the corrected image can be suppressed.

In environments in which the target offset level Offset_tgt does not vary greatly, the target offset level Offset_tgt may be employed directly as the offset level Offset, as shown in the equation (4) below, without using the exponential smoothing process to calculate the offset level Offset.

$$Offset = Offset\_tgt \quad (4)$$

The offset subtraction circuit 1 subtracts the offset level Offset output from the offset level calculation circuit 15 for each frame from the brightness signal Yi of the input image to calculate an offset brightness signal Yofst, as shown in the equation (5) below.

$$Yofst = Yi - \text{Offset} \quad (5)$$

The offset brightness signal Yofst is input to the white correction gain brightness multiplication circuit 3.

Since the offset level Offset is obtained by multiplying the minimum brightness value Ymin calculated from the average surrounding area brightness values Yavg of the pixels subject to correction in the input image by the offset coefficient KB calculated on the basis of the number of black pixels NumB in the input image, a gradation correction that expands the brightness signal distribution can be carried out without causing pixels to collapse to black.

The white correction gain calculation circuit 30 calculates a white correction gain WGain from the offset level Offset output from the offset level generation circuit 10 for each frame and the target upper limit Wtgt not exceeding the maximum gradation value Yfc of the brightness signal in accordance with equation (6) or (7) below. The maximum brightness level of the gradation range displayed as white in the frame is set as the target upper limit Wtgt.

If Offset < Wtgt − 1 then
WGain = Wtgt/(Wtgt − Offset)     (6)
If Offset ≥ Wtgt − 1 then
WGain = Wtgt     (7)

The white correction gain brightness multiplication circuit 3 multiplies the brightness signal Yofst output from the offset subtraction circuit 1 by the white correction gain WGain output from the white correction gain calculation circuit 30 to obtain the brightness signal Yw, as indicated by the equation (8) below.

$$Yw = WGain \times Yofst \quad (8)$$

Since the white correction gain WGain is generated so as to keep the corrected brightness signal Yw from exceeding the maximum gradation value Yfc of the brightness signal Yi of the input image, its effect is to prevent an increase in the number of washed-out pixels in the corrected image formed by the brightness signal Yw multiplied by the white correction gain WGain and the color difference signals Cbi, Cri.

Figure 16A:
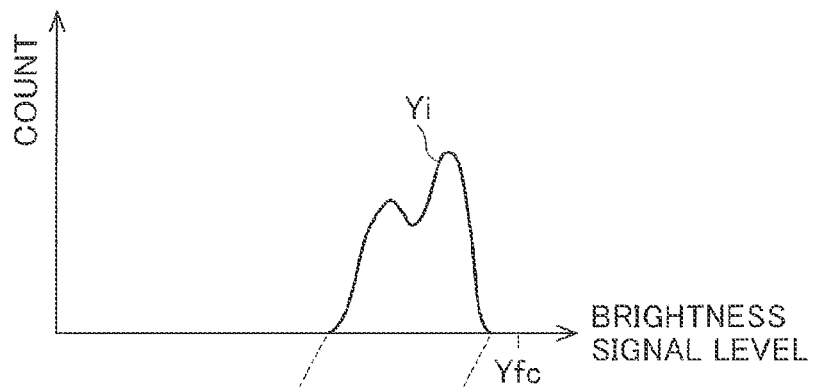
FIGS. 16(a) to 16(c) are diagrams illustrating variations in the brightness signal distribution of the input image, the image that has been offset by the offset subtraction circuit, and the image after white correction in the white correction gain brightness multiplication circuit.
Figure 16B:
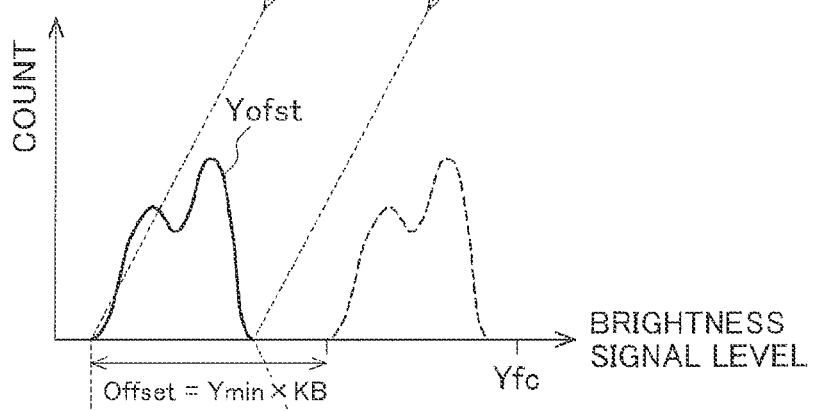
Figure 16C:
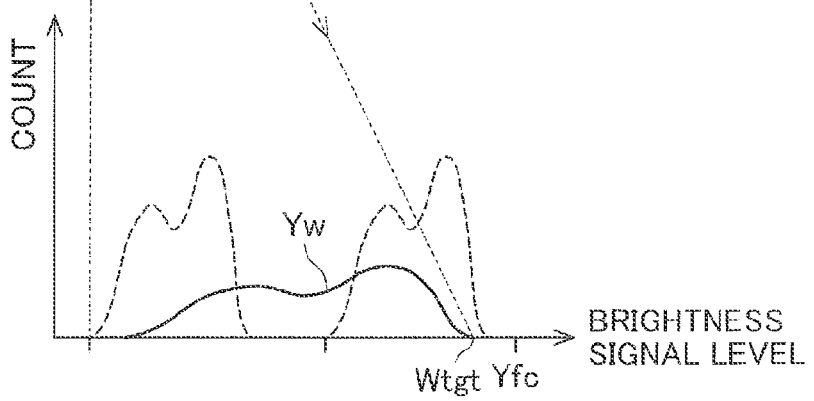

FIGS. 16(*a*) to 16(*c*) show exemplary distributions of the brightness signal Yi of the input image, the brightness signal Yofst output from the offset subtraction circuit 1, and the brightness signal Yw output from the white correction gain brightness multiplication circuit 3.

The distribution of the brightness signal Yofst in FIG. 16(*b*) is obtained by shifting the distribution of the brightness signal Yi in FIG. 16(*a*) to the left by the offset level Offset without other alteration. The distributions of the brightness signal Yi in FIG. 16(*a*) and the brightness signal Yofst in FIG. 16(*b*) are positioned differently but have the same shape.

The distribution of the brightness signal Yw in FIG. 16(*c*) is obtained by stretching the distribution of the brightness signal Yofst in FIG. 16(*b*) in the horizontal direction with its left end held fixed. The distributions of the brightness signal Yw in FIG. 16(*c*) and the brightness signal Yi in FIG. 16(*a*) are positioned differently and have different shapes.

The offset subtraction circuit 1 and the white correction gain brightness multiplication circuit 3 make the distribution of the brightness signal Yw in FIG. 16(*c*) wider than the distribution of the brightness signal Yi, improving the contrast of images taken in foggy, hazy, or rainy weather. However, the average value of the distribution of the brightness signal Yw in FIG. 16(*c*) becomes lower than the average value of the distribution of the brightness signal Yi in FIG. 16(*a*), making the image formed by the brightness signal Yw and color difference signals CBi and Cri darker than the input image.

The average brightness correction gain brightness multiplication circuit 4 and the average brightness correction gain generation circuit 40 are provided to mitigate this effect.

The average pre-correction brightness value calculation circuit 41 in the average brightness correction gain generation circuit 40 in FIG. 3 calculates the average brightness value APLpre of the whole frame from the brightness signal Yi of the input image. That is, the average pre-correction brightness value calculation circuit 41 generates an average brightness value of the input image signal. The input image signal here is the brightness signal Yi of the input image. The average brightness value APLpre is obtained by dividing the sum of the brightness signals Yi of all pixels in the frame of the input image by the total number of pixels. The average brightness value APLpre is input to the target average brightness value calculation circuit 47.

The average post-correction brightness value calculation circuit 42 calculates the average post-correction brightness value APLpost of the brightness signal Ywa output from the average brightness correction gain brightness multiplication circuit 4 in the whole frame. That is, the average post-correction brightness value calculation circuit 42 generates an average brightness value of the corrected image signal. The corrected image signal here is the brightness signal Ywa. The average post-correction brightness value APLpost is obtained by dividing the sum of brightness values Ywa of all pixels of the corrected image frame by the total number of pixels.

The average brightness value APLpost is input to the average brightness correction gain calculation circuit 48.

The representative primary color signal pixel value generation circuit 43 calculates primary-color signals R, G, B for each pixel by a matrix operation using the brightness signal Ywa output from the average brightness correction gain brightness multiplication circuit 4 and the color difference signals Cbi, Cri of the input image. That is, the representative primary color signal pixel value generation circuit 43 converts the corrected image signal and the color difference signals of the input image to three primary-color signals and generates their maximum value for each pixel. The corrected image signal here is brightness signal Ywa.

The matrix operation is performed on the basis of a color transformation matrix formula corresponding to the display system of the output image, such as, for example, the formula given by the equations (9) below.

R = +1.00 × Ywa + 0.00 × Cbi + 1.40 × Cri
G = +1.00 × Ywa − 0.34 × Cbi − 0.71 × Cri
B = +1.00 × Ywa + 1.77 × Cbi + 0.00 × Cri     (9)

The equations (9) above represent NTSC standard color transformation formulae, but color transformation formulae for a different standard, e.g., the sRGB standard, may be used, to be suitable for the output image display system.

The representative primary color signal pixel value generation circuit 43 calculates the maximum value MAX(R, G, B) of the primary color signals R, G, B for each pixel as given above and outputs the maximum value as a representative pixel value M_POST.

The representative pixel value M_POST is input to the color saturated pixel counting circuit 44 and average color saturation quantity calculation circuit 45.

The color saturated pixel counting circuit 44 compares the representative pixel value M_POST output from the representative primary color signal pixel value generation circuit 43 with a predetermined threshold value SATmin, counts the number of pixels having a representative pixel value M_POST equal to or greater than the predetermined threshold value SATMin, and outputs the resulting count for each frame as the number of color saturated pixels SATnum. That is, the color saturated pixel counting circuit 44 counts, for each frame, the number SATnum of color saturated pixels having maximum values M_POST equal to or greater than a predetermined level.

The predetermined threshold value SATmin is set with a margin to prevent color saturation from occurring when the image is displayed.

The counted number SATnum of color saturated pixels is input to the average color saturation quantity calculation circuit 45.

The average color saturation quantity calculation circuit 45 calculates a total absolute color saturation quantity difference SATsub from the representative pixel value M_POST output from the representative primary color signal pixel value generation circuit 43, the number of color saturated pixels SATnum output from the color saturated pixel counting circuit 44, and a predetermined threshold value SATmin according to equation (10), and then calculates the average color saturation quantity SATavg according to equation (11).

$$SATsub = \Sigma(M\_POST - SATmin) \quad (10)$$

$$SATavg = SATsub/SATnum \quad (11)$$

SATsub in equation (10) represents the sum total of the quantity M_POST−SATmin for all pixels with M_POST values that satisfy SATmin≤M_POST (the sum of SATnum values of the form M_POST−SATMin).

The calculated average color saturation quantity SATavg is input to the average brightness value correction quantity calculation circuit 46.

The average brightness value correction quantity calculation circuit 46 calculates a color saturation correction level SATADJ from the number of color saturated pixels SATnum output from the color saturated pixel counting circuit 44, the average color saturation quantity SATavg output from the average color saturation quantity calculation circuit 45, the number of pixels per frame NMAX, and an intensity coefficient SATstr that is applied to the average brightness value correction quantity, according to equation (12) below. The color saturation correction level SATADJ is used as the average brightness value correction quantity.

$$SATADJ = SATavg \times (SATnum/NMAX) \times SATstr \quad (12)$$

The term (SATnum/NMAX) on the right side of equation (12) corresponds to the proportion of the area in which color saturation occurs.

In this configuration, the average color saturation quantity calculation circuit 45 and average brightness value correction quantity calculation circuit 46 respectively calculate the average color saturation quantity SATavg and the number of color saturated pixels SATnum, after which the color saturation correction level SATADJ is calculated, but the color saturation correction level SATADJ may also be calculated according to equation (13), from the SATsub calculated by equation (10).

$$SATADJ = (SATsub/NMAX) \times SATstr \quad (13)$$

Equation (13) is derived by substituting equation (11) into the SATavg in equation (12), as follows.

$$\begin{aligned} SATADJ &= SATavg \times (SATnum/NMAX) \times SATstr \\ &= (SATsub/SATnum) \times (SATnum/NMAX) \times SATstr \\ &= (SATsub/NMAX) \times SATstr \end{aligned}$$

If the color saturation correction level SATADJ is obtained by equation (13), it can be obtained even without dividing by the number of color saturated pixels SATnum in the calculation of the average color saturation quantity SATavg and multiplying by the number of color saturated pixels SATnum in the calculation of the color saturation correction level SATADJ. The effect is that the number of dividers and multipliers can be reduced, so that the circuit size can be reduced.

The average color saturation quantity calculation circuit 45 and average brightness value correction quantity calculation circuit 46 form a color saturation correction level generation circuit 51 for generating the color saturation correction level SATADJ on the basis of the number of color saturated pixels SATnum and the maximum value M_POST.

The target average brightness value calculation circuit 47 calculates a target average brightness value APL_TGT from the average brightness value APLpre of the input image output from the average pre-correction brightness value calculation circuit 41, the color saturation correction level SATADJ output from the average brightness value correction quantity calculation circuit 46, and an adjustment value APLADJ for producing a desired difference in average brightness value before and after the correction, according to equation (14). That is, the target average brightness value calculation circuit 47 generates a target image level on the basis of the average brightness value APLpre of the input image signal and the color saturation correction level SATADJ of the corrected image signal. The target image level here is the target average brightness value APL_TGT.

$$APL\_TGT = APLpre + APLADJ - SATADJ \quad (14)$$

The adjustment value APLADJ is set beforehand to produce a desired level of difference in average brightness values before and after the correction. The adjustment value APLADJ may be externally adjustable.

The target average brightness value APL_TGT is input to the average brightness correction gain calculation circuit 48.

Since the adjustment value term APLADJ is added in the formula for calculating the target average brightness value APL_TGT, the desired level of difference in average brightness value before and after the correction can be produced. When the input image is too bright or too dark, the target average brightness value APL_TGT can be changed quickly by using the adjustment value APLADJ.

The average brightness correction gain calculation circuit 48 calculates an average brightness correction gain APLGain from the target average brightness value APL_TGT output from the target average brightness value calculation circuit 47 and the average brightness value APLpost of the corrected image output from the average post-correction brightness value calculation circuit 42.

That is, the average brightness correction gain calculation circuit 48 generates the average brightness correction gain APLGain such that the average brightness value of the corrected image signal approaches the target image level. The target image level here is the target average brightness value APL_TGT. The average brightness value is the average brightness value APLpost.

In the calculation of the average brightness correction gain APLGain, a target average brightness correction gain APL- Gain_tgt is calculated first, and then the average brightness correction gain APLGain is calculated on the basis of the target average brightness correction gain APLGain_tgt.

The target average brightness correction gain APLGain_tgt is calculated as follows, on the basis of the target average brightness APL_TGT and the average brightness value APLpost of the output image. If APLpost equals APLGain, the value of APLGain_tgt(t−1) in the immediately preceding frame is used directly as APLGain_tgt(t) in the current frame. If APLpost does not equal APLGain, APLGain_tgt is obtained according to the equation (15) below and is used as APLGain_tgt(t) in the current frame.

$$APLGain\_tgt = APL\_TGT/APLpost \quad (15)$$

The target average brightness correction gain APLGain_tgt is calculated for each frame and may vary from frame to frame. To reduce the effect of these variations, the exponential smoothing process expressed by equation (16) is performed by using an exponential smoothing coefficient KApl (with a value between 0 and 1, inclusive). In equation (16), APLGain_tgt(t) is the target average brightness correction gain calculated for a given frame, and Offset_tgt(t−1) is the target average brightness correction gain calculated one frame before.

$$\begin{aligned} APLGain &= KApl \times APLGain\_tgt(t) \\ &+ (1 - KApl) \times APLGain\_tgt(t-1) \end{aligned} \quad (16)$$

The calculated average brightness correction gain APLGain is input to the average brightness correction gain brightness multiplication circuit 4.

With the configuration described above, variations in the average brightness value of the corrected image can be suppressed even if the average brightness value of the input image varies greatly from frame to frame.

In environments in which the target average brightness correction gain APLGain_tgt does not fluctuate strongly, the exponential smoothing process need not be used in the calculation of the average brightness correction gain APLGain; the target average brightness correction gain APLGain may be output directly as the average brightness correction gain, as indicated by the equation (17) below.

$$APLGain = APLGain\_tgt \quad (17)$$

The target average brightness value calculation circuit 47 and average brightness correction gain calculation circuit 48 form an average brightness correction gain determination circuit 52 for determining the average brightness correction gain APLGain on the basis of the average brightness value APLpost of the corrected image signal and the color saturation correction level SATADJ of the corrected image signal. That is, the average brightness correction gain determination circuit 52 determines the average brightness correction gain APLGain on the basis of the average brightness value APLpost of the corrected image signal and the color saturation correction level SATADJ of the corrected image signal.

The average brightness correction gain brightness multiplication circuit 4 multiplies the brightness signal Yw output from the white correction gain brightness multiplication circuit 3 by the average brightness correction gain APLGain output from the average brightness correction gain calculation circuit 48 to obtain a corrected brightness signal Ywa. This multiplication operation is expressed by the equation (18) below.

$$Ywa = APLGain \times Yw \quad (18)$$

If the brightness signal distribution of the input image is not biased toward the high brightness side, the color saturation correction level SATADJ for the image often becomes 0. If the adjustment value APLADJ is also 0, the target average brightness correction gain APLGain_tgt is the ratio of the pre-correction average brightness value APLpre to the post-correction average brightness value APLpost, and the post-correction average brightness comes closer to the pre-correction average brightness (with the effect that the post-correction average brightness comes closer to the target image level APL_TGT and the same image brightness is maintained before and after the correction.)

The brightness saturation processing circuit 5 performs saturation processing on the brightness signal Ywa output from the average brightness correction gain brightness multiplication circuit 4 and calculates the saturation-processed brightness signal Ya. In the saturation processing, if the gradation value calculated for the brightness signal Ywa exceeds the maximum value Yfc, the gradation value is limited to the maximum value Yfc.

The mixing circuit 6 mixes the brightness signal Yi of the input image and the brightness signal Ya output from the brightness saturation processing circuit 5 at the mixing ratio KMIX output from the mixing ratio generation circuit 65, as expressed in equation (1) above, and produces the output brightness signal Yo.

The mixing ration KMIX is determined in accordance with the low brightness pixel ratio RLY as described earlier. As the value of the mixing ratio KMIX increases, the mixing proportion of the brightness signal Yi increases; as the value of the mixing ratio KMIX decreases, mixing proportion of the brightness signal Ya increases.

Figure 17:
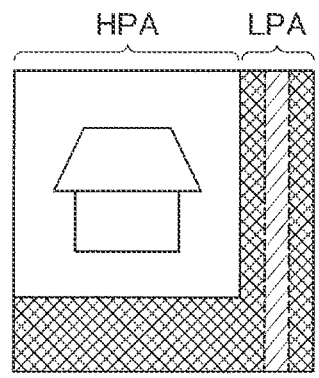
FIG. 17 is a schematic drawing showing an exemplary output image in the first embodiment.

FIG. 17 shows an exemplary output image obtained by processing the input image in FIG. 4. In the image of the house shrouded in fog taken through a window in FIG. 4, the low brightness region LPA is displayed without alteration and without black collapse, as shown in FIG. 17, while the contrast of the house in the non-low brightness region HPA is improved.

Since the low brightness image region is identified and contrast is corrected in image regions other than the low brightness image region, the contrast of a subject having a narrow brightness signal distribution because, for example, the subject is shrouded in fog can be improved without causing black collapse in a low brightness image region due to a window frame or the like visible in front of the subject.

Here, the effect of providing the average brightness value correction quantity calculation circuit 46 will be described.

If no average brightness value correction quantity calculation circuit 46 is provided, the following problem arises.

Figure 18:
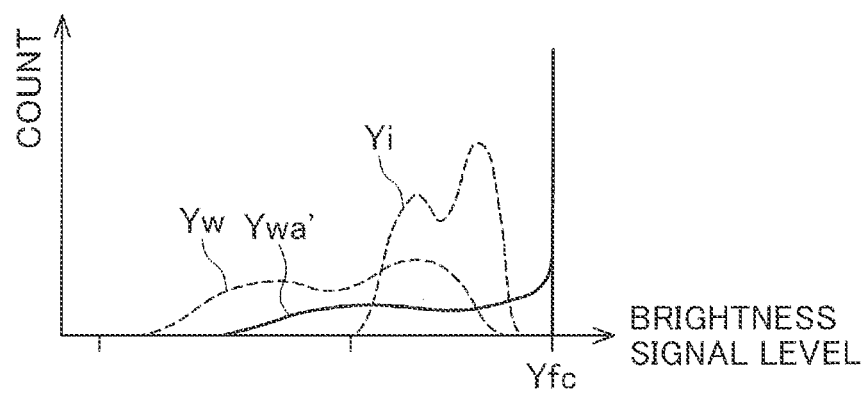
FIG. 18 is a diagram illustrating variations in brightness signal distribution similar to those in FIG. 19 when no average brightness value correction quantity calculation circuit is provided.

FIG. 18 shows the distribution of the brightness signal Yi of the input image and the distribution of the brightness signal Ywa' output from the average brightness correction gain brightness multiplication circuit 4 when no average brightness value correction quantity calculation circuit 46 is provided. The average brightness correction gain calculation circuit 48 calculates an average brightness correction gain APLGain to make the average brightness value APLpre of the brightness signal Yi of the input signal and the average brightness value APLpost of brightness signal Ywa' equal to each other. Accordingly, the distribution of brightness signal Ywa' approaches the maximum value Yfc of the gradation of the brightness signal, increasing the number of washed-out pixels.

Moreover, the primary color signals R, G, B obtained through a matrix operation of brightness signal Ywa' and the color difference signals Cbi, Cri have maximum gradation values in an increasing number of pixels, changing the hue of an increasing number of images. In the NTSC system, for example, the primary color signals R and B are calculated from brightness signal Ywa' and the color difference signals Cbi, Cri according to the equations (19) and (20) below. If the color difference signals Cbi, Cri are positive, the primary color signals R and B have maximum gradation values, causing color saturation and changing the hue, even if brightness signal Ywa' does not reach the maximum gradation value Yfc.

$$R = +1.00 \times Ywa' + 0.00 \times Cbi + 1.40 \times Cri \quad (19)$$
$$B = +1.00 \times Ywa' + 1.77 \times Cbi + 0.00 \times Cri \quad (20)$$

Figure 19:
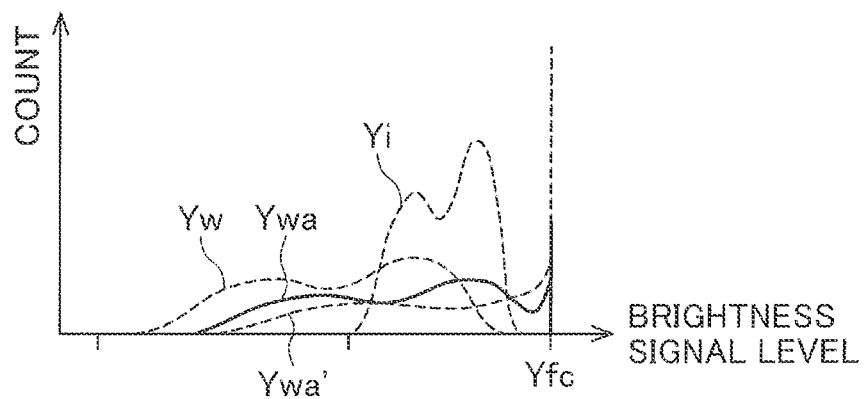
FIG. 19 is a diagram illustrating variations in the brightness signal distribution of the input image, the image after white correction in the white correction gain brightness multiplication circuit, and the image after average brightness correction in the average brightness correction gain brightness multiplication circuit.

FIG. 19 schematically shows the distribution of the brightness signal Yi of the input image and the distribution of the brightness signal Ywa output from the average brightness correction gain brightness multiplication circuit 4 when the average brightness value correction quantity calculation circuit 46 is provided. The average brightness correction gain calculation circuit 48 calculates the average brightness correction gain APLGain from a value obtained by subtracting the color saturation correction level SATADJ from the average brightness value APLpre of the brightness signal Yi of the input image and the ratio of the average brightness value APLpost of brightness signal Ywa, so that the distribution of brightness signal Ywa is not biased toward the maximum value Yfc of the gradation of the brightness signal as much as the distribution of the brightness signal Ywa' shown in FIG. 18, output from the average brightness correction gain brightness multiplication circuit 4 when the average brightness value correction quantity calculation circuit 46 is not present. As a result, increases in the number of washed-out pixels, the number of pixels in which the primary color signals R, G, B obtained by a matrix operation using the brightness signal Ywa and color difference signals Cbi, Cri have the maximum gradation value Yfc, and the number of pixels with altered hues can be mitigated.

In an image processing device that extracts and outputs a part of the input image, the minimum brightness value detection circuit 12 can be configured so that instead of using the minimum average surrounding area brightness value Yavg in the whole frame as the minimum brightness value Ymin as in the embodiment described above, it outputs the minimum value in the extracted and output part, rather than the minimum value in the entire input image frame, as the minimum brightness value Ymin.

Similar considerations apply to the black pixel counting circuit 13, average pre-correction brightness value calculation circuit 41, average post-correction brightness value calculation circuit 42, color saturated pixel counting circuit 44, and average brightness value correction quantity calculation circuit 46.

In the first embodiment, on the basis of the brightness signal Yi and the corrected image Ywa of the input image in each frame, when the input of the brightness signal Yi of the input image of the frame finishes, the offset level generation circuit 10 generates an offset level Offset, the white correction gain calculation circuit 30 generates a white correction gain WGain, the average brightness correction gain generation circuit 40 generates an average brightness correction gain APLGain, and the generated offset level Offset, white correction gain WGain, and average brightness correction gain APLGain are used in the correction of the brightness signal Yi in the next frame, but this does not cause serious problems provided the image does not vary greatly between consecutive frames.

In order to use the offset level Offset, white correction gain WGain, and average brightness correction gain APLGain generated on the basis of the brightness signal Yi and corrected image Ywa of the input image in a given frame to correct the brightness signal in the same frame, a circuit (a storage circuit) for delaying the brightness signal Yi by a single frame can be inserted before the offset subtraction circuit 1 in FIG. 1.

Second Embodiment

Figure 20:
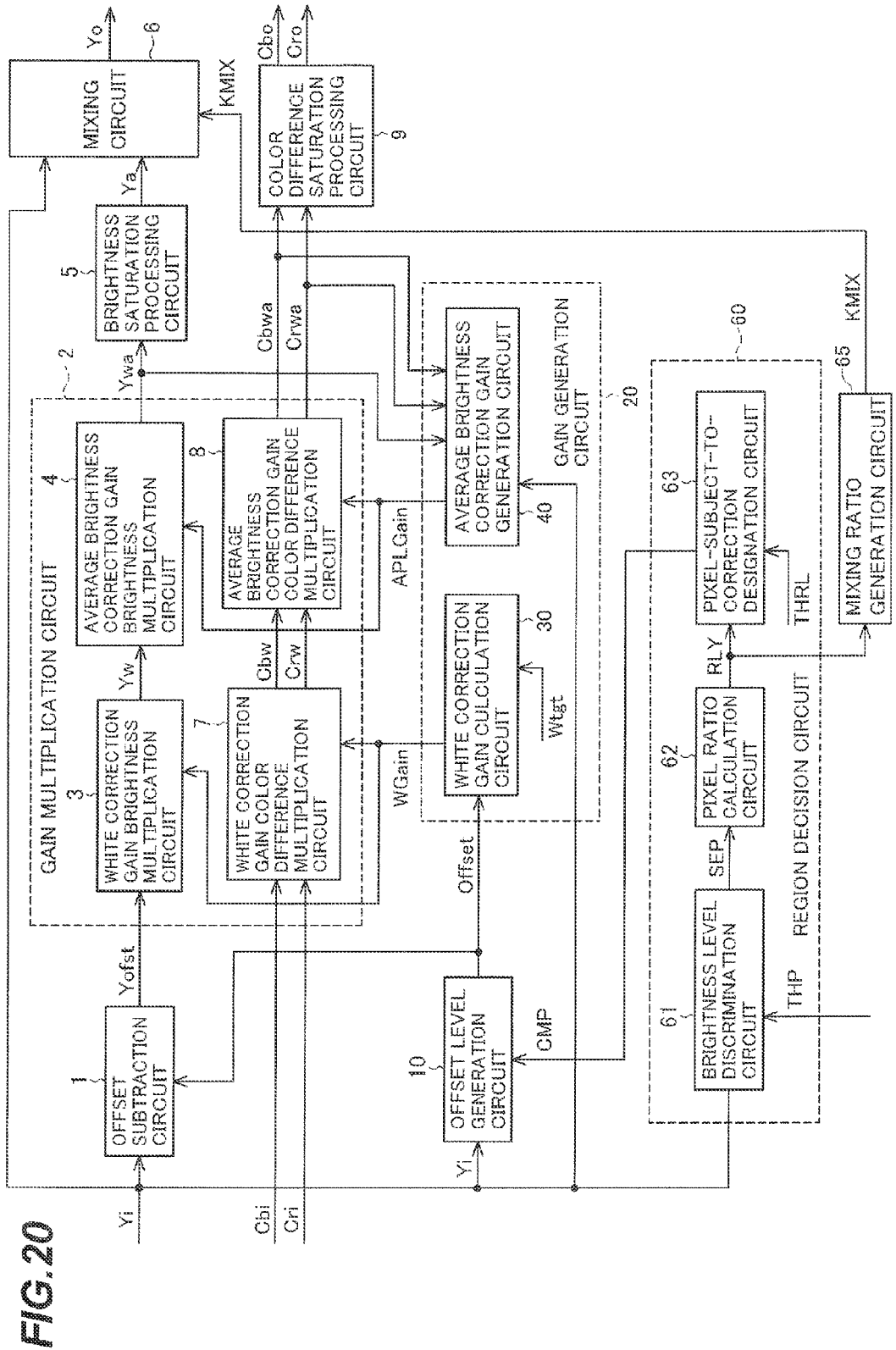
FIG. 20 is a block diagram schematically showing the configuration of an image processing device according to a second embodiment of the invention.

FIG. 20 shows an image processing device according to a second embodiment of the invention.

The image processing device shown in FIG. 20 is generally identical to, but differs from the image processing device in the first embodiment in FIG. 1 in the following points: the gain multiplication circuit 2 further includes a white correction gain color difference multiplication circuit 7 and an average brightness correction gain color difference multiplication circuit 8, a color difference saturation processing circuit 9 is added, and gradation corrections of the color difference signals are carried out.

The parts that differ from the first embodiment will be described below.

The white correction gain color difference multiplication circuit 7 multiplies the color difference signals Cbi, Cri of the input image by the white correction gain WGain output from the white correction gain calculation circuit 30 to obtain color difference signals Cbw, Crw. The color difference signals Cbw, Crw are input to the average brightness correction gain color difference multiplication circuit 8.

The average brightness correction gain color difference multiplication circuit 8 multiplies the color difference signals Cbw, Crw output from the white correction gain color difference multiplication circuit 7 by the average brightness correction gain APLGain output from the average brightness correction gain calculation circuit 48 in the average brightness correction gain generation circuit 40 to obtain color difference signals Cbwa, Crwa. These color difference signals Cbwa, Crwa are input to the representative primary color signal pixel value generation circuit 43 in the average brightness correction gain generation circuit 40 and to the color difference saturation processing circuit 9.

The color difference saturation processing circuit 9 performs saturation processing on the color difference signals Cbwa, Crwa output from the average brightness correction gain color difference multiplication circuit 8 and outputs corrected color difference signals Cbo and Cro.

Gradation corrections of the color difference signals are not simply gradation corrections of the brightness signals. They can also improve the saturation of an image the saturation of which is lowered by, for example, foggy, hazy, or rainy weather. The color saturation quantity is calculated, and the gains for the brightness signal and color difference signals are corrected in accordance with the color saturation quantity. Accordingly, although a gradation correction is carried out on the color difference signals, the resulting increase in the number of pixels with altered hue can be mitigated.

The average brightness correction gain generation circuit 40 in the first embodiment generates the average brightness correction gain on the basis of the color difference signals Cbi, Cri of the input signal, while the average brightness correction gain generation circuit 40 in the second embodiment generates the average brightness correction gain on the basis of the color difference signals Cbo and Cro of the corrected image. Both circuits perform the same processes.

In a manner similar to that described in the first embodiment, a circuit for delaying the brightness signal Yi and the color difference signals Cbi, Cri of the input image by a single frame may be inserted before the offset subtraction circuit 1 and white correction gain color difference multiplication circuit 7 in FIG. 20 in the second embodiment, and the offset subtraction circuit 1, white correction gain brightness multiplication circuit 3, average brightness correction gain brightness multiplication circuit 4, white correction gain color difference multiplication circuit 7, and average brightness correction gain color difference multiplication circuit 8 may be configured to generate the brightness signal Ywa and color difference signals Cbwa, Crwa from the offset level Offset, white correction gain Wgain, and average brightness correction gain APLGain calculated on the basis of the brightness signal Yi and color difference signals Cbi and Cbr of the input image of the immediately preceding frame, and the brightness signal Yi and color difference signals Cbi, Cri of the current frame.

Third Embodiment

Although the image processing devices in the first and second embodiments have been described as hardware, all or part of the devices in the first and second embodiments can be implemented by software, that is, by a programmed computer.

Figure 21:
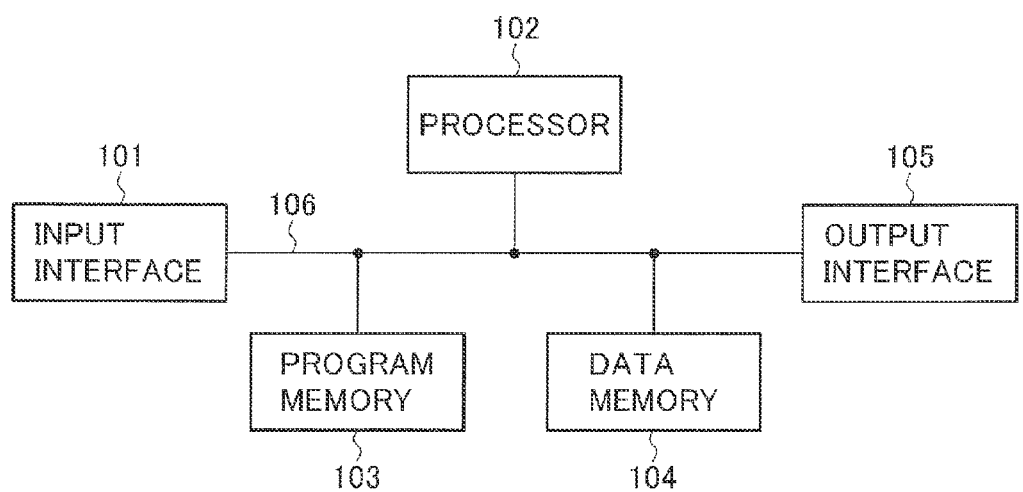
FIG. 21 is a block diagram schematically showing the configuration of an image processing device according to a third embodiment of the invention.

The image processing device is then configured as shown in FIG. 21.

The image processing device shown in FIG. 21 includes an input interface 101, a processor 102, a program memory 103, a data memory 104, an output interface 105, and a bus 106 for interconnecting those components.

The processor 102 operates on an image input through the input interface 101 in accordance with a program stored in the program memory 103. During the operation, a variety of data are stored in the data memory 104. The image generated as the result of the processing is output through the output interface 105.

Figure 22:
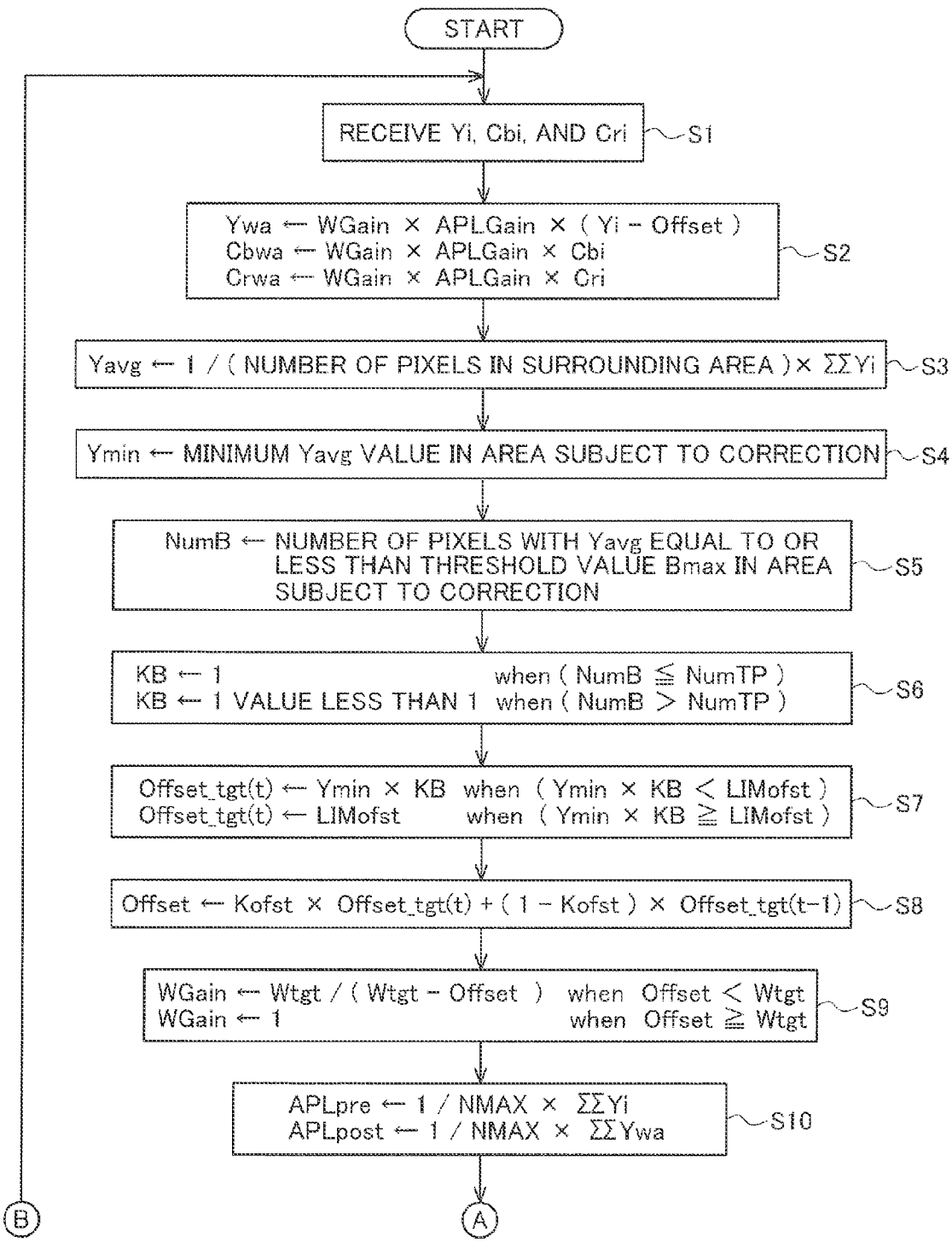
FIG. 22 is a flowchart illustrating an image processing method carried out by the image processing device according to the third embodiment.
Figure 23:
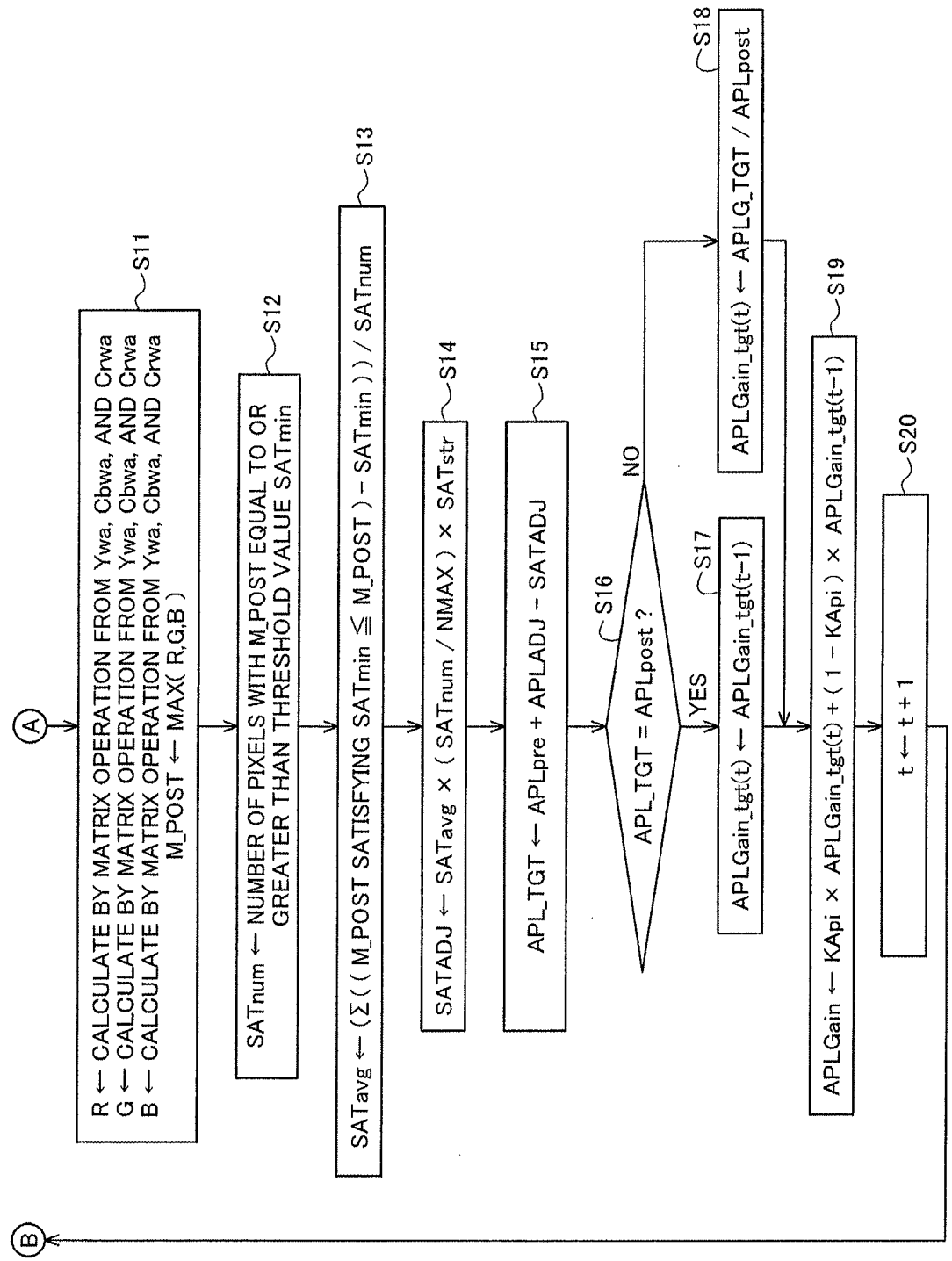
FIG. 23 is a flowchart illustrating the image processing method carried out by the image processing device according to the third embodiment.

The operation of the configuration shown in FIG. 21 will be described below with reference to FIGS. 22 and 23 for a case in which processing similar to the processing performed by the image processing device in the second embodiment is carried out.

For brevity's sake, in the subsequent description it will be assumed that the brightness signal and color difference signals of the pixels of a whole input image frame are input one frame at a time, instead of being input one pixel at a time.

In step S1, the brightness signal Yi and color difference signals Cbi, Cri of the input image are received.

In step S2, a brightness signal Ywa and color difference signals Cbwa, Crwa are calculated from the brightness signal Yi and color difference signals Cbi, Cri of the input image of the current frame and the calculated offset level Offset, white correction gain WGain, and average brightness correction gain APLGain. The offset level Offset, white correction gain WGain, and average brightness correction gain APLGain used here are those which have been calculated on the basis of the brightness signal Yi of the input image of the immediately preceding frame and the brightness signal Ywa and color difference signals Cbwa and Crwa of the corrected image. This process is the same as the process performed in the offset subtraction circuit 1, white correction gain brightness multiplication circuit 3, and average brightness correction gain brightness multiplication circuit 4 in FIG. 1.

In step S3, an average surrounding area brightness value Yavg is calculated for each pixel in the current frame. This process is the same as the process performed in the surrounding area brightness averaging circuit 11 in FIG. 2.

In step S4, the minimum brightness value Ymin, which is the minimum value of the average surrounding area brightness values Yavg of the pixels in the region subject to correction in the current frame, is calculated. This process is the same as the process performed in the minimum brightness value detection circuit 12 in FIG. 2.

In step S5, the number NumB of black pixels that, which are pixels in the region subject to correction in the current frame that have average surrounding area brightness values Yavg equal to or less than a predetermined threshold value Bmax, is counted. This process is the same as in the black pixel counting circuit 13 in FIG. 2.

In step S6, an offset coefficient KB is calculated in accordance with the number of black pixels NumB. This process is the same as the process performed in the offset coefficient calculation circuit 14 in FIG. 2.

In step S7, a target offset level Offset_tgt is calculated from the minimum brightness value Ymin calculated in step S4, the offset coefficient KB calculated in step S6, and a predetermined threshold value LIMOfst. In step S8, an offset level Offset is calculated from the target offset level Offset_tgt by exponential smoothing. The process in steps S7 and S8 is the same as the process performed in the offset level calculation circuit 15 in FIG. 2.

In step S9, a white correction gain WGain is calculated from the offset level Offset calculated in step S8 and a target upper limit Wtgt of gradation of the brightness signal. This process is the same as the process performed in the white correction gain calculation circuit 30 in FIG. 20.

In step S10, an average pre-correction brightness value APLpre, which is an average of the brightness signals Yi of the pixels in the whole frame, and an average post-correction brightness value APLpost, which is an average of the brightness signals Ywa of the pixels in the whole frame, are calculated. This process is the same as the process performed in the average pre-correction brightness value calculation circuit 41 and average post-correction brightness value calculation circuit 42 in FIG. 3.

In step S11, primary color signals R, G, B are calculated by a matrix operation from the brightness signal Ywa and color difference signals Cbwa, Crwa calculated in step S2, and a maximum value MAX(R, G, B) of the primary signals R, G, B of each pixel is calculated as a representative pixel value M_POST. This process is the same as the process performed in the representative primary color signal pixel value generation circuit 43 in FIG. 3.

In step S12, the number SATnum of color saturated pixels that have a representative pixel value M_POST equal to or more than a predetermined threshold SATmin is counted. This process is the same as the process performed in the color saturated pixel counting circuit 44 in FIG. 3.

In step S13, the values obtained by subtracting the predetermined threshold SATmin from the representative pixel value M_POST of the color saturated pixels in the frame are added up, and the sum is divided by the number of color saturated pixels SATnum to obtain an average color saturation quantity SATavg. This process is the same as the process expressed by equations (10) and (11) carried out by the average color saturation quantity calculation circuit 45 in FIG. 3.

In step S14, a color saturation correction level SATADJ is calculated from the number of color saturated pixels SATnum calculated in step S12, the average color saturation quantity SATavg calculated in step S13, the number of pixels per frame NMAX, and an intensity coefficient SATstr applied to the average brightness value correction quantity. This process is the same as the process expressed by equation (12) carried out in the average brightness value correction quantity calculation circuit 46 in FIG. 3.

In step S15, a target average brightness value APL_TGT is calculated from the average pre-correction brightness value APLpre calculated in step S10, the color saturation correction level SATADJ calculated in step S14, and an adjustment value APLADJ that produces a desired difference between the average brightness values before and after the correction. This process is the same as the process expressed by the equation (14) carried out in the target average brightness value calculation circuit 47 in FIG. 3.

In step S16, the target average brightness value APE_TGT calculated in step S15 is compared with the average post-correction brightness value APLpost calculated in step S10. If it is determined here that APL_TGT=APLpost, the process proceeds to step S17. If APL_TGT=APLpost is determined to be untrue, the process proceeds to step S18.

In step S17, the target average brightness correction gain APLGain_tgt(t−1) calculated one frame before is retained as the target average brightness correction gain APLGain_tgt(t) of the current frame.

In step S18, the target average brightness correction gain APLGain_tgt of the current frame is calculated from the target average brightness value APL_TGT calculated in step S15 and the average post-correction brightness value APLpost calculated in step S10. The calculation is the same as the calculation in the first embodiment described with reference to equation (15).

In step S19, the average brightness correction gain APLGain is calculated from the target average brightness correction gain APLGain_tgt by an exponential smoothing process. The calculation is the same as the calculation described in the first embodiment with reference to equation (16). The processing in the above-described steps S16, S17, S18, S19 is the same as the processing performed in the average brightness correction gain calculation circuit 48 in FIG. 3.

In step S20, the counter t (representing the frame number) used in steps S7, S8, S17, S18, and S19 is updated, and a return is made to step S1 to start processing the next input image.

When the corrected image includes a small number of color saturated pixels SATnum or has a small average color saturation quantity SATavg, the processing in steps S11 to S19 can reduce the difference between the average post-correction brightness value APLpost and the average pre-correction brightness value APLpre.

When the corrected image includes a large number of color saturated pixels SATnum or has a large average color saturation quantity SATavg, control can be made such that the increase in the number of pixels whose hue is altered by the correction is mitigated, and the difference between the average post-correction brightness value APLpost and the average pre-correction brightness value APLpre is reduced.

As in the first and second embodiments, a step of delaying the brightness signal Yi and the color difference signals Cbi, Cri of the input image by a single frame may be inserted before step S2 in the third embodiment, so that in step S2, the brightness signal Ywa and color difference signals Cbwa, Crwa of the corrected image may be generated from the offset level Offset, white correction gain WGain, and average brightness correction gain APLGain calculated from the brightness signal Yi and color difference signals Cbi and Cbr of the input image in the immediately preceding frame, and the brightness signal Yi and color difference signals Cbi, Cri of the current frame.

The invention has been described above as an image processing device, but the image processing method implemented by the above image processing device is also part of the invention.

REFERENCE CHARACTERS

1 offset subtraction circuit, 2 gain multiplication circuit, 3 white correction gain brightness multiplication circuit, 4 average brightness correction gain brightness multiplication circuit, 5 brightness saturation processing circuit, 6 mixing circuit, 7 white correction gain color difference multiplication circuit, 8 average brightness correction gain color difference multiplication circuit, 9 color difference saturation processing circuit, 10 offset level generation circuit, 11 surrounding area brightness averaging circuit, 12 minimum brightness value detection circuit, 13 black pixel counting circuit, 14 offset coefficient calculation circuit, 15 offset level calculation circuit, 20 gain generation circuit, 30 white correction gain calculation circuit, 40 average brightness correction gain generation circuit, 41 average pre-correction brightness value calculation circuit, 42 average post-correction brightness value calculation circuit, 43 representative primary color signal pixel value generation circuit, 44 color saturated pixel counting circuit, 45 average color saturation quantity calculation circuit, 46 average brightness value correction quantity calculation circuit, 47 target average brightness value calculation circuit, 48 average brightness correction gain calculation circuit, 51 color saturation correction level generation circuit, 52 average brightness correction gain determination circuit, 60 region decision circuit, 61 brightness level discrimination circuit, 62 pixel ratio calculation circuit, 63 pixel-subject-to-correction designation circuit, 65 mixing ratio generation circuit.

What is claimed is:
1. An image processing method comprising:
a region decision step of deciding whether each pixel of an image represented by an image signal is disposed within a region subject to correction, in which pixels having at most a predetermined brightness level appear with a frequency equal to or less than a predetermined value;
an offset level generation step of generating an offset level on a basis of the brightness of those pixels in the image represented by the image signal which are determined in the region decision step to be within the region subject to correction;
an offset subtraction step of subtracting the offset level generated in the offset level generation step from the image signal to generate an offset image signal;
a gain generation step of generating a gain for the offset image signal; and
a gain multiplication step of multiplying the offset image signal by the gain to generate a corrected image signal;
a mixing ratio generation step of generating a mixing ratio for each pixel of the image represented by the image signal on a basis of a low brightness pixel ratio, which is a proportion of pixels having at most the predetermined brightness level to pixels surrounding said each pixel; and
a mixing step of mixing the image signal and the corrected image signal on a basis of the mixing ratio.
2. An image processing device comprising:
a region decision circuit for deciding whether each pixel of an image represented by an image signal is disposed within a region subject to correction, in which pixels having at most a predetermined brightness level appear with a frequency equal to or less than a predetermined value:
an offset level generation circuit for generating an offset level on a basis of the brightness of those pixels in the image represented by the image signal which are determined by the region decision circuit to be within the region subject to correction;
an offset subtraction circuit for subtracting the offset level generated by the offset level generation circuit from the image signal to generate an offset image signal;
a gain generation circuit for generating a gain for the offset image signal;
a gain multiplication circuit for multiplying the offset image signal by the gain to generate a corrected image signal;
a mixing ratio generation circuit for generating a mixing ratio for each pixel of the image represented by the image signal on a basis of a low brightness pixel ratio, which is a proportion of pixels having at most the predetermined brightness level to pixels surrounding said each pixel; and
a mixing circuit for mixing the image signal and the corrected image signal on a basis of the mixing ratio.

3. The image processing device of claim 2, wherein the region decision circuit comprises:
a brightness level discrimination circuit for comparing the pixel value of each pixel of the image represented by the image signal with the predetermined brightness level and identifying pixels having at most the predetermined brightness level;
a pixel ratio calculation circuit for taking each pixel of the image represented by the image signal in turn as a pixel of interest and calculating the proportion of those pixels in a predetermined range of surrounding pixels centered on the pixel of interest, which are determined by the brightness level discrimination circuit as having at most the predetermined brightness level, as the low brightness ratio; and
a pixel-subject-to-correction designation circuit for deciding that each pixel is disposed within the region subject to correction if the low brightness pixel ratio of the pixel is equal to or less than a predetermined threshold, and outputting a signal indicating the decision result as a subject-to-correction identification signal.

4. The image processing device of claim 3, wherein the mixing ratio generation circuit generates the mixing ratio by converting the low brightness pixel ratio calculated by the pixel ratio calculation circuit, in accordance with a predetermined conversion characteristic.

5. The image processing device of claim 4, wherein the mixing ratio generation circuit has a conversion characteristic such that when the low brightness pixel ratio is equal to or more than a predetermined upper limit, the mixing ratio is 100%, and when the low brightness pixel ratio is within the range from 0% to the upper limit, the mixing ratio increases linearly from 0% to 100% as the low brightness pixel ratio increases.

6. The image processing device of claim 4, wherein the mixing ratio generation circuit has a conversion characteristic such that when the low brightness pixel ratio is equal to or less than a predetermined lower limit, the mixing ratio is 0%, and when the low brightness pixel ratio is within the range from the lower limit to 100%, the mixing ratio increases linearly from 0% to 100% as the low brightness pixel ratio increases.

7. An image processing device comprising:
a region decision circuit for deciding whether each pixel of an image represented by an image signal is disposed within a region subject to correction, in which pixels having at most a predetermined brightness level appear with a frequency equal to or less than a predetermined value;
an offset level generation circuit for generating an offset level on a basis of the brightness of those pixels in the image represented by the image signal which are determined by the region decision circuit to be within the region subject to correction;
an offset subtraction circuit for subtracting the offset level generated by the offset level generation circuit from the image signal to generate an offset image signal;
a gain generation circuit for generating a gain for the offset image signal; and
a gain multiplication circuit for multiplying the offset image signal by the gain to generate a corrected image signal, wherein:
the gain generation circuit comprises
a white correction gain calculation circuit for generating a white correction gain on a basis of the offset level of the image signal and a predetermined target upper limit, and
an average brightness correction gain generation circuit for generating an average brightness correction gain on a basis of an average brightness value of the image signal, an average brightness value of the corrected image signal, and a color saturation correction level; and
the gain multiplication circuit comprises
a white correction gain brightness multiplication circuit for multiplying the offset image signal by the white correction gain to generate a white corrected image signal, and
an average brightness correction gain brightness multiplication circuit for multiplying the white corrected image signal by the average brightness correction gain to generate an average brightness corrected image signal.

8. The image processing device of claim 7, wherein the average brightness correction gain generation circuit comprises:
an average pre-correction brightness value calculation circuit for generating an average brightness value of the image signal;
an average post-correction brightness value calculation circuit for generating an average brightness value of the corrected image signal;
a representative primary color signal pixel value generation circuit for converting the corrected image signal to three primary color signals and generating their maximum value for each pixel;
a color saturated pixel counting circuit for counting, for each frame, the number of color saturated pixels having a maximum value equal to or greater than a predetermined level;
a color saturation correction level generation circuit for generating a color saturation correction level on a basis of the number of color saturated pixels and the maximum values; and
an average brightness correction gain determination circuit for determining the average brightness correction gain on a basis of the average brightness value of the corrected image signal and the color saturation correction level of the corrected image signal.

9. The image processing device of claim 8, wherein the average brightness correction gain determination circuit comprises:

a target average brightness value calculation circuit for generating a target image level on a basis of the average brightness value of the image signal and the color saturation correction level of the corrected image signal; and an average brightness correction gain calculation circuit for generating the average brightness correction gain such that the average brightness value of the corrected image signal approaches the target image level.

10. The image processing device of claim 7, wherein the offset level generation circuit comprises:

a surrounding area brightness averaging circuit for taking each pixel of the image signal as a pixel of interest and calculating an average surrounding area pixel value for the pixel of interest;

a minimum brightness value detection circuit for detecting the minimum value of the average surrounding pixel values obtained for the pixels in the image represented by the image signal, in the region subject to correction consisting of pixels determined by the region decision circuit to be subject to correction;

a black pixel counting circuit for counting, in each frame, the number of black level pixels having an average surrounding pixel value equal to or less than a predetermined level;

an offset coefficient calculation circuit for generating an offset coefficient on a basis of the number of black level pixels; and an offset level calculation circuit for calculating the offset level on a basis of the minimum value and the offset coefficient.

* * * * *